US012672606B2

(12) United States Patent
Sauerwald et al.

(10) Patent No.: US 12,672,606 B2
(45) Date of Patent: Jul. 7, 2026

(54) END-EFFECTOR

(71) Applicant: FIELDWORK ROBOTICS LIMITED, Exmouth (GB)

(72) Inventors: Thomas Sauerwald, Cambridge (GB); Chris Fernando Pulle, Cambridge (GB); Troy Bodkin, Cambridge (GB); Dan Whitear, Biggleswade (GB)

(73) Assignee: FIELDWORK ROBOTICS LIMITED, Exmouth (GB)

( * ) Notice: Subject to any disclaimer, the term of this patent is extended or adjusted under 35 U.S.C. 154(b) by 318 days.

(21) Appl. No.: 18/569,916

(22) PCT Filed: Jun. 14, 2022

(86) PCT No.: PCT/EP2022/066199
§ 371 (c)(1),
(2) Date: Dec. 13, 2023

(87) PCT Pub. No.: WO2022/263456
PCT Pub. Date: Dec. 22, 2022

(65) Prior Publication Data
US 2024/0284829 A1     Aug. 29, 2024

(30) Foreign Application Priority Data

Jun. 14, 2021     (GB) ..................................... 2108460

(51) Int. Cl.
*A01D 46/30*          (2006.01)
*A01D 46/22*          (2006.01)
(Continued)

(52) U.S. Cl.
CPC ............. *A01D 46/30* (2013.01); *A01D 46/22* (2013.01); *B25J 5/007* (2013.01); *B25J 9/0084* (2013.01);
(Continued)

(58) Field of Classification Search
CPC ...... A01D 46/30; A01D 46/22; A01D 46/253; A01D 46/005; A01D 46/24; B25J 5/007; B25J 9/0084; B25J 15/0023; B25J 15/10
See application file for complete search history.

(56) References Cited

U.S. PATENT DOCUMENTS

| | | | |
|---|---|---|---|
| 2,968,907 A | 1/1961 | Bernheim et al. | |
| 2017/0105349 A1* | 4/2017 | Carrigan ................ | A01D 90/10 |

(Continued)

FOREIGN PATENT DOCUMENTS

| | | |
|---|---|---|
| CN | 110506499 A | 11/2019 |
| CN | 112060111 A | 12/2020 |

(Continued)

OTHER PUBLICATIONS

International Preliminary Report on Patentability in Application No. PCT/EP2022/066199 dated Dec. 14, 2023, 17 pages.
(Continued)

*Primary Examiner* — Russell Frejd
(74) *Attorney, Agent, or Firm* — Barclay Damon LLP

(57) ABSTRACT

The present invention provides an end-effector (400) for a robotic arm in which a membrane (430) is inflatable to grasp an object. The end-effector comprises an internal volume (414) for receiving said object to be picked and the flexible membrane (430) within the internal volume. The membrane defines an aperture and an inflatable volume, and is configurable to increase the inflatable volume from an uninflated configuration to an inflated grasping configuration to thereby narrow the aperture and permit an object within the internal volume to be grasped. The present inventors have identified that by using an inflatable membrane to grasp a fruit or vegetable to be picked, swift picking and short cycle times can be achieved without damaging the vulnerable fleshy part of the fruit. The invention has particular application for the
(Continued)

picking of soft fruits such as berries, e.g. raspberries, which are especially susceptible to damage.

18 Claims, 13 Drawing Sheets

(51) Int. Cl.

| | |
|---|---|
| *A01D 46/253* | (2006.01) |
| *B25J 5/00* | (2006.01) |
| *B25J 9/00* | (2006.01) |
| *B25J 15/00* | (2006.01) |

(52) U.S. Cl.
CPC ......... *B25J 15/0023* (2013.01); *A01D 46/253* (2013.01)

(56) References Cited

U.S. PATENT DOCUMENTS

| | | | | |
|---|---|---|---|---|
| 2017/0273241 A1* | 9/2017 | Salisbury | ............... | A01D 46/24 |
| 2019/0261566 A1* | 8/2019 | Robertson | ................ | G06T 7/50 |

| | | | | |
|---|---|---|---|---|
| 2020/0001473 A1 | 1/2020 | Lee | | |
| 2020/0008355 A1* | 1/2020 | Nir | ......................... | A01D 46/30 |
| 2020/0288636 A1 | 9/2020 | Kent et al. | | |
| 2022/0174877 A1* | 6/2022 | Requena | ................ | A01D 46/30 |

FOREIGN PATENT DOCUMENTS

| | | | |
|---|---|---|---|
| GB | 2566535 A | 3/2019 |
| JP | S61230882 A | 10/1986 |
| WO | 2006082100 A1 | 8/2006 |
| WO | 2019053474 A2 | 3/2019 |
| WO | 2020177002 A1 | 9/2020 |
| WO | 2020201766 A1 | 10/2020 |

OTHER PUBLICATIONS

International Search Report and Written Opinion in Application No. PCT/EP2022/066199 dated Sep. 14, 2022, 19 pages.

* cited by examiner

400

417    418    416    432

436    430

454    438

452    452

450    434

414

END-EFFECTOR

CROSS-REFERENCE TO RELATED APPLICATIONS

This application is the national phase entry of International Patent Application No. PCT/EP2022/066199, filed Jun. 14, 2022, and claims the benefit of Great Britain Patent Application No. 2108460.3, filed Jun. 14, 2021, the disclosures of which are incorporated herein by reference in their entirety.

TECHNICAL FIELD

This invention relates to an end-effector for a robotic picking arm, in particular an end-effector for picking fruit or vegetables.

BACKGROUND

In recent years the use of robotic arms to pick fruit or vegetables has been widely explored. An example of such a robotic arm is described in WO2019/053474. A suitable fruit or vegetable picking/harvesting system for use with such a robotic arm is described in WO2020/201766. The content of both of these patent applications is incorporated by reference.

Key factors in the commercial success of picking systems employing such robotic arms are the cycle time associated with picking each item of fruit or vegetable, the ability to pick items of fruit or vegetables that are growing in close proximity to each other (i.e in clusters), and the importance of not damaging the fruit or vegetable during the picking process. The present invention aims to reduce such cycle times, and enable picking from clusters.

SUMMARY OF THE INVENTION

In general terms, the present invention provides an end-effector for a robotic arm in which a membrane is inflatable to grasp an object and/or a plurality of pliable elements are configurable to grip an object.

Thus, a first aspect of the invention provides an end-effector for a robotic arm, the end-effector comprising: an internal volume for receiving an object to be picked; and a flexible membrane within the internal volume, the membrane defining an aperture and an inflatable volume, and the membrane being configurable to increase the inflatable volume from an uninflated configuration to an inflated grasping configuration to thereby narrow the aperture and permit an object within the internal volume to be grasped.

Also disclosed is a method of picking a fruit or vegetable using the end-effector according to the first aspect, the method including the steps of: moving the end-effector until a fruit or vegetable is located within the internal volume; and inflating the inflatable volume to the inflated grasping configuration to thereby narrow the aperture and grasp the fruit or vegetable.

The present inventors have identified that by using an inflatable membrane to grasp a fruit or vegetable to be picked, swift picking and short cycle times can be achieved without damaging the vulnerable fleshy part of the fruit or vegetable, and while picking from clusters. The invention has particular application for the picking of soft fruits such as berries, e.g. raspberries or strawberries, which are especially susceptible to damage from alternative types of end-effector.

The internal volume may comprise a generally tube-shaped cavity, for example a cavity within a housing. The internal volume is sized to receive a targeted fruit or vegetable. The end-effector may include a housing defining the internal volume. The membrane may be sealed to the housing.

The membrane preferably comprises a generally flexible sheet arranged around the internal volume and sealed at upper and lower regions thereof. The membrane preferably forms a generally annular inflatable volume, a centre region thereof defining the aperture. In the uninflated configuration the aperture is sufficiently large for the object to be picked to pass therethrough. Narrowing of the aperture via inflation of the inflatable volume causes the object to be grasped.

In some embodiments the membrane may define a plurality of inflatable volumes arranged around a periphery of the internal volume. In related embodiments, a plurality of inflatable volumes arranged around a periphery of the internal volume may be defined by a plurality of membranes. The plurality of inflatable volumes may be inflatable in tandem to narrow the aperture.

In the inflated grasping configuration the membrane may grasp either the stem or the fleshy part of a targeted fruit or vegetable.

Preferred embodiments include a pressure sensor configured to monitor a pressure within the inflatable volume. The sensor provides feedback about the force applied by the membrane to the fruit or vegetable. Such data can be used, for example, to detect when the fruit or vegetable has been appropriately grasped and/or when the fruit or vegetable has been picked. The pressure sensor may be located anywhere that is in fluid communication with the inflatable volume.

The end-effector preferably includes one or more conduits arranged to permit air entry to and/or exit from the inflatable volume. Such conduits provide fluid communication between a pump or other air source and the inflatable volume.

In preferred embodiments the end-effector includes a plurality of conduits, each conduit arranged to permit fluid (e.g. air) entry to and/or exit from a different portion of the inflatable volume. In this way, inflation of particular portions of the inflatable volume can be ensured, or prioritised.

The membrane may include a plurality of regions around its circumference, including one or more first regions (optionally having a first cross-sectional profile) that are less resistant to inflation than one or more second regions (optionally having a second cross-sectional profile). For example, the one or more first regions may be relatively more flexible, or more readily deformable, than the one or more second regions. The one or more first regions may define the aperture and contact the fruit or vegetable. The one or more second regions may each provide a fold or other means which in use separates neighbouring first regions from one another. For example, the one or more first regions may each form a radially-inwardly extending tongue in the inflated grasping configuration. Such arrangements result in a more controllable and/or predictable grip. They also provide consistent centring of the fruit or vegetable to be picked.

In such embodiments each of the plurality of conduits is preferably configured to permit fluid (e.g. air) entry to and/or exit from a portion of the inflatable volume defined (i.e. bounded) by a respective one of the one or more first regions. This results in a particularly reliable and repeatable inflation.

In some embodiments the membrane has two different inflated configurations: a first inflation to grip an upper part of a fruit or vegetable, such as a stem, and a second inflation to urge a lower part of the fruit or vegetable, such as the fleshy part, away from the stem.

In such arrangements the membrane may define a cavity below the aperture, the cavity being wider than the aperture in the inflated grasping configuration, and the membrane being further inflatable from the inflated grasping configuration to an inflated picking configuration to thereby narrow the cavity. Preferably, as the cavity is narrowed a portion of the membrane is urged downwardly away from the aperture. The cavity preferably generally increases in width with distance from the aperture in the inflated grasping configuration. This arrangement may serve to enable such downward urging.

In use, in the inflated grasping configuration an upper portion of an object to be picked (such as a stem) is preferably grasped by the membrane in the region of the aperture, and in the inflated picking configuration narrowing of the cavity preferably causes a lower portion of the object (such as a fleshy part) to be urged downwardly away from the grasped upper portion.

In methods according to the invention, wherein the membrane may define a cavity below the aperture, the cavity being wider than the aperture in the inflated grasping configuration, and in the inflated grasping configuration an upper portion of the fruit or vegetable is grasped, the method including the subsequent step of: further inflating the inflatable volume to an inflated picking configuration to thereby narrow the cavity to cause a lower portion of the fruit or vegetable to be urged downwardly away from the grasped upper portion.

An upper region of the membrane may have different properties to a lower region of the membrane. For example, the upper region of the membrane may be less resistant to inflation than the lower region of the membrane. In this way, the upper region can inflate first to provide the gripping configuration and the lower region can inflate subsequently to provide the picking configuration.

At least a portion of the upper region of the membrane may comprise a relatively stiff material. For example, a relatively thick area of material or a material having desirable material properties. Such an arrangement may ensure secure gripping of the fruit or vegetable stem.

At least a portion of the lower region of the membrane may comprise a relatively flexible material. For example, a relatively thin area or material or a material having desirable material properties. Such an arrangement may avoid damage to the fleshy part of the fruit or vegetable.

In particular embodiments the end-effector may further comprise a second flexible membrane within the internal volume, the second membrane defining a second inflatable volume and a second aperture positioned beneath the aperture of the membrane, the second membrane being configurable to increase the second inflatable volume to an inflated picking configuration to thereby narrow the second aperture. In this way, the membrane may be used to grasp the stem of a fruit or vegetable and the second membrane may be used to urge the fleshy part of the fruit or vegetable away from the stem to thereby pick it. Thus, in use, in the inflated grasping configuration the membrane may grasp an upper portion of an object to be picked, and in the inflated picking configuration the second membrane may urge a lower portion of the object downwardly away from the grasped upper portion.

In methods according to the invention the end-effector may comprise a second flexible membrane within the internal volume, the second membrane defining a second inflatable volume and a second aperture positioned beneath the aperture of the membrane, and in the inflated grasping configuration an upper portion of the fruit or vegetable is grasped, the method including the subsequent step of: inflating the second inflatable volume to an inflated picking configuration to thereby cause a lower portion of the fruit or vegetable to be urged downwardly away from the grasped upper portion.

An end-effector according to the first aspect may further comprise a gripping assembly including: a first member defining an entry aperture configured to admit an object to be picked into the internal volume; a second member; and a plurality of pliable gripping elements, each gripping element having a first end connected to the first member and a second end connected to the second member, wherein relative rotation between the first member and second member causes the gripping assembly to move between an initial configuration and a gripping configuration in which the gripping elements intersect with one another across the entry aperture.

Similarly, in methods according to the first aspect, the end-effector may further comprise a gripping assembly including: a first member defining an entry aperture configured to admit an object to be picked into the internal volume; a second member; and a plurality of pliable gripping elements, each gripping element having a first end connected to the first member and a second end connected to the second member, wherein relative rotation between the first member and second member causes the gripping assembly to move between an initial configuration and a gripping configuration in which the gripping elements intersect with one another across the entry aperture, and the method may include the further step of: moving the gripping assembly from the initial configuration to the gripping configuration to grip a stem of the fruit or vegetable.

Such arrangements are particularly advantageous since they enable the stem (e.g. peduncle) of a targeted fruit or vegetable to be gripped by the gripping assembly while the flesh of the fruit of vegetable is grasped by the inflatable membrane, thus enabling separation of the two parts.

The first member may comprise an upper (or uppermost) member, provided towards the uppermost region of the end-effector. The first member may have a generally dome-shaped outer profile. The internal volume may be located generally within a volume defined by the first member.

The second member may comprise a lower member, provided generally lower than the first member. The second member may have a generally ring-shaped, or collar-shaped, configuration, and be generally axially-aligned with the first member. In preferred embodiments, the second member is rotatable relative to the first member to move the gripping assembly between the initial configuration and gripping configuration.

In the initial configuration the entry aperture is generally open to admit an object to be picked into the internal volume. That is, in the initial configuration the gripping elements preferably do not substantially obscure the entry aperture, or otherwise extend across the entry aperture.

In the gripping configuration the pliable gripping elements may intersect so that they become interlinked with one another, for example to converge at an intersection point. In use, a stem or other object may be encircled by the pliable gripping elements at the intersection point to thereby be gripped.

The gripping assembly preferably includes three or more pliable gripping elements. Three gripping elements is considered optimum for the purposes of gripping the stem of a fruit or vegetable. However, in some embodiments a higher (or lower) number of cords may be utilised. Each gripping element preferably comprises an elongate cord-like element. Each gripping element preferably conforms to the shape of an object gripped by the gripping assembly.

Each gripping element is preferably attached to the first member at a respective one of a plurality of first attachment points, and to the second member at a respective one of a plurality of second attachment points. The first attachment points are preferably distributed equidistantly around the centreline of the end-effector (i.e. around the entry aperture). In preferred embodiments, the first attachment points are adjacent an edge of the entry aperture. Similarly, the second attachment points are preferably distributed equidistantly around the centreline of the end-effector (i.e. around the entry aperture). In preferred embodiments, the second attachment points are circumferentially offset from the first attachment points in the initial configuration, to thereby enable the gripping element to remain taut in the initial configuration. The first member and/or second member may include one or more guide features to guide movement of the gripping elements during transition between the initial and gripping configurations.

Each gripping element preferably comprises an elastic material, and/or elastic portion, such that its length can extend as the gripping assembly moves from the initial configuration to the gripping configuration, and vice versa. This arrangement enables a particularly good grip to be provided on a stem in the gripping configuration, while minimising the risk of inadvertently cutting the stem. In particular, the elastic properties enable a degree of over-rotation of the second member to be provided, to provide a good grip. In addition, the elastic properties also ensure that the gripping elements are retracted in the initial configuration, so that they do not obscure the entry aperture. In some embodiments the gripping elements may comprise one or more non-stretchable portions and one or more elastic portions. In other embodiments the gripping elements may have no elastic properties at all, but may instead be slack in the initial configuration and taut in the gripping configuration.

In yet further embodiments the gripping elements may also, or alternatively, include a cutting portion configured to cut the stem of a fruit or vegetable in the gripping configuration.

The entry aperture is preferably sized to receive a single fruit or vegetable of a target fruit or vegetable type to be picked. For example, the entry aperture is preferably sized to receive a single soft fruit, such as a raspberry or strawberry.

In preferred embodiments the end-effector has a picking configuration in which relative movement between the gripping assembly and the flexible membrane is provided. Similarly, the method may include the subsequent step of providing relative movement between the gripping assembly and the flexible membrane to pick the fruit or vegetable.

In this way, the fleshy part of a fruit or vegetable (grasped by the inflatable membrane) may be easily separated from the stem (gripped by the gripping assembly). By achieving this picking step by relative movement between gripping assembly and flexible membrane, no movement of the robotic arm is required, and therefore no complex control of the arm movement. In addition, the picking step is more consistent and controllable. There is also less disruption to the plant or tree from which the fruit or vegetable is being picked.

Preferably, in the picking configuration relative linear movement is provided between the gripping assembly and the flexible membrane. Such linear movement provides a particularly advantageous picking motion for many fruits or vegetables.

In particularly preferred embodiments, in the picking configuration the gripping assembly moves linearly away from the flexible membrane. That is, the flexible membrane (which may be mounted in a fixed position relative to the mounting structure of the end-effector to which a robotic arm is mounted) remains stationary while the gripping assembly moves. This arrangement provides a particularly consistent and controllable picking motion.

A second aspect of the invention provides an end-effector for a robotic arm, the end-effector comprising: an internal volume for receiving an object to be picked; and a gripping assembly including: a first member defining an entry aperture configured to admit an object to be picked into the internal volume; a second member; and a plurality of pliable gripping elements, each gripping element having a first end connected to the first member and a second end connected to the second member, wherein relative rotation between the first member and second member causes the gripping assembly to move between an initial configuration and a gripping configuration in which the gripping elements intersect with one another across the entry aperture.

Also disclosed is a related method of picking a fruit or vegetable using the end-effector of the first aspect, the method including the steps of: moving the end-effector until a fruit or vegetable is located within the internal volume; and moving the gripping assembly from the initial configuration to the gripping configuration to grip a stem of the fruit or vegetable.

Such arrangements are particularly advantageous in applications in which a stem (e.g. peduncle) of a targeted fruit of vegetable is engaged in order to achieve a desired picking step.

The first member may comprise an upper (or uppermost) member, provided towards the uppermost region of the end-effector. The first member may have a generally dome-shaped outer profile. The internal volume may be located generally within a volume defined by the first member.

The second member may comprise a lower member, provided generally lower than the first member. The second member may have a generally ring-shaped, or collar-shaped, configuration, and be generally axially-aligned with the first member. In preferred embodiments, the second member is rotatable relative to the first member to move the gripping assembly between the initial configuration and gripping configuration.

In the initial configuration the entry aperture is generally open to admit an object to be picked into the internal volume. That is, in the initial configuration the gripping elements preferably do not substantially obscure the entry aperture, or otherwise extend across the entry aperture.

In the gripping configuration the pliable gripping elements may intersect so that they become interlinked with one another, for example to converge at an intersection point. In use, a stem or other object may be encircled by the pliable gripping elements at the intersection point to thereby be gripped.

The gripping assembly preferably includes three or more pliable gripping elements. Three gripping elements is considered optimum for the purposes of gripping the stem of a fruit or vegetable. However, in some embodiments a higher (or lower) number of cords may be utilised. Each gripping element preferably comprises an elongate cord-like element. Each gripping element preferably conforms to the shape of an object gripped by the gripping assembly.

Each gripping element is preferably attached to the first member at a respective one of a plurality of first attachment points, and to the second member at a respective one of a plurality of second attachment points. The first attachment points are preferably distributed equidistantly around the centreline of the end-effector (i.e. around the entry aperture). In preferred embodiments, the first attachment points are adjacent an edge of the entry aperture. Similarly, the second attachment points are preferably distributed equidistantly around the centreline of the end-effector (i.e. around the entry aperture). In preferred embodiments, the second attachment points are circumferentially offset from the first attachment points in the initial configuration, to thereby enable the gripping element to remain taut in the initial configuration. The first member and/or second member may include one or more guide features to guide movement of the gripping elements during transition between the initial and gripping configurations.

The internal volume may comprise a generally tube-shaped cavity, for example a cavity within a housing. The internal volume is sized to receive a targeted fruit or vegetable. The end-effector may include a housing defining the internal volume. The membrane may be sealed to the housing.

Each gripping element preferably comprises an elastic material, and/or elastic portion, such that its length can extend as the gripping assembly moves from the initial configuration to the gripping configuration. This arrangement enables a particularly good grip to be provided on a stem in the gripping configuration, while minimising the risk of inadvertently cutting the stem. In particular, the elastic properties enable a degree of over-rotation of the second member to be provided, to provide a good grip. In addition, the elastic properties also ensure that the gripping elements are retracted in the initial configuration, so that they do not obscure the entry aperture. In some embodiments the gripping elements may comprise one or more non-stretchable portions and one or more elastic portions. In other embodiments the gripping elements may have no elastic properties at all, but may instead be slack in the initial configuration and taut in the gripping configuration.

In yet further embodiments the gripping elements may also, or alternatively, include a cutting portion configured to cut the stem of a fruit or vegetable in the gripping configuration.

The entry aperture is preferably sized to receive a single fruit or vegetable of a target fruit or vegetable type to be picked. For example, the entry aperture is preferably sized to receive a single soft fruit, such as a raspberry or strawberry.

In preferred embodiments the end-effector further comprises a flexible membrane within the internal volume, the membrane defining an aperture and an inflatable volume, and the membrane being configurable to increase the inflatable volume from an uninflated configuration to an inflated grasping configuration to thereby narrow the aperture and permit an object within the internal volume to be grasped. Similarly, the method may include the step of inflating the inflatable volume to the inflated grasping configuration to thereby narrow the aperture and grasp the fruit or vegetable.

Such arrangements are particularly advantageous since they enable the stem (e.g. peduncle) of a targeted fruit or vegetable to be gripped by the gripping assembly while the flesh of the fruit of vegetable is grasped by the inflatable membrane, thus enabling separation of the two parts.

The membrane may have any of the features of the membrane of the end-effector according to the first aspect, set out above.

In particular, the membrane preferably comprises a generally flexible sheet arranged around the internal volume and sealed at upper and lower regions thereof. The membrane preferably forms a generally annular inflatable volume, a centre region thereof defining the aperture. In the uninflated configuration the aperture is sufficiently large for the object to be picked to pass therethrough. Narrowing of the aperture via inflation of the inflatable volume causes the object to be grasped.

Also, the membrane may include a plurality of regions around its circumference, including one or more first regions (optionally having a first cross-sectional profile) that are less resistant to inflation than one or more second regions (optionally having a second cross-sectional profile). For example, the one or more first regions may be relatively more flexible, or more readily deformable, then the one or more second regions. The one or more first regions may define the aperture and contact the fruit or vegetable. The one or more second regions may each provide a fold or other means which in use separates neighbouring first regions from one another. For example, the one or more first regions may each form a radially-inwardly extending tongue in the inflated grasping configuration. Such arrangements result in a more controllable and/predictable grip. They also provide consistent centring of the fruit to be picked.

In preferred embodiments the end-effector has a picking configuration in which relative movement between the gripping assembly and the flexible membrane is provided. Similarly, the method may include the subsequent step of providing relative movement between the gripping assembly and the flexible membrane to pick the fruit or vegetable.

In this way, the fleshy part of a fruit or vegetable (grasped by the inflatable membrane) may be easily separated from the stem (gripped by the gripping assembly). By achieving this picking step by relative movement between gripping assembly and flexible membrane, no movement of the robotic arm is required, and therefore no complex control of the arm movement. In addition, the picking step is more consistent and controllable. There is also less disruption to the plant or tree from which the fruit or vegetable is being picked.

Preferably, in the picking configuration relative linear movement is provided between the gripping assembly and the flexible membrane. Such linear movement provides a particularly advantageous picking motion for many fruits or vegetables.

In particularly preferred embodiments in the picking configuration the gripping assembly moves linearly away from the flexible membrane. That is, the flexible membrane (which may be mounted in a fixed position relative to the mounting structure of the end-effector to which a robotic arm is mounted) remains stationary while the gripping assembly moves. This arrangement provides a particularly consistent and controllable picking motion.

The end-effector of the first or second aspects may include a local storage vessel beneath the internal volume, the local storage vessel defining a collection volume for collecting objects picked by the end-effector. Thus, the collection volume may be used to collect a plurality of items of fruit or vegetable picked by the end-effector, to minimise the number of times the robotic picking arm must deliver its picked items to the filling location or other storage destination. Thus, cycle times are reduced.

The local storage vessel preferably comprises a door at a lower face thereof, the door being openable from a closed configuration to an open configuration. The door may obscure an open lower face of the collection volume in the closed configuration and/or may expose the open lower face in the open configuration. Thus, in the closed configuration picked objects are contained within the collection volume, and in the open configuration picked objects fall out of the collection volume under gravity. The door is in the closed configuration during the grasping and/or picking operations, and is only opened when the picked objects are delivered to the filling location or other storage destination.

In methods according to the first or second aspects the invention the end-effector may include a local storage vessel beneath the internal volume, the local storage vessel defining a collection volume for collecting fruit or vegetables picked by the end-effector, and the local storage vessel comprising a door at a lower face thereof, the method including the subsequent steps of: moving the end-effector to a filling location; and opening the door of the local storage vessel to deliver picked fruit or vegetables from the collection volume to the filling location.

The end-effector of the first or second aspects may include a pump configured to deliver air to and/or expel air from the inflatable volume. For example, the pump may be an air pump such as a compressed air pump. The pump may be controllable via a valve such as a solenoid valve. When the end-effector is installed on a robotic picking arm, the pump may be located at or adjacent a base of the picking arm. This arrangement minimises the mass of the end-effector that must be supported and moved by the picking arm.

The end-effector of the first or second aspects may include one or more position sensors configured to sense a position of an object relative to the end-effector. Information from the position sensors may be used by a control system of a robotic picking arm to which the end-effector is attached, to ensure the end-effector is accurately located relative to a fruit or vegetable to be picked.

The end-effector of the first or second aspects may comprise an object entry passageway for guiding an object to be picked into the internal volume, the object entry passageway being positioned above the internal volume and having a width that narrows towards the internal volume. The passageway may serve to funnel fruit or vegetables to be picked towards the centre of the internal volume and the aperture of the membrane.

Alternatively, or in addition, the end-effector of the first or second aspects may comprise a tapered outer surface defining an uppermost opening of the end-effector, the outer surface being tapered so that its width increases with distance from the uppermost opening. In some embodiments the tapered outer surface may be provided on the first member, or upper member, of the gripping assembly. This arrangement serves to enable a single targeted fruit or vegetable located in a cluster of fruit or vegetables to be readily isolated. The non-targeted fruit or vegetables in the cluster will tend to be urged away from the object entry passageway and/or the internal volume by the tapered outer surface. In preferred embodiments the uppermost opening forms an upper opening of the object entry passageway and/or the entry aperture of the end-effector. The tapered outer surface may be tapered at an acute angle of slope of 30 degrees or more, optionally 40 degrees or more, optionally 50 degrees or more, relative to a plane of the uppermost opening.

A third aspect of the invention provides a robotic picking arm comprising an end-effector according to the first aspect or second aspect.

The robotic picking arm may be configured to move the end-effector downwardly through a picking movement trajectory when the membrane is in the inflated grasping configuration. Similarly, the method of the invention may include the subsequent step of: moving the end-effector downwardly through a picking movement trajectory when the membrane is in the inflated grasping configuration. Such an arrangement ensures detachment of the picked fruit or vegetable from its cane, bush, tree or other growing medium. The nature of the picking movement trajectory, including direction, speed and acceleration, may be optimised for the particular type of fruit or vegetable to be picked.

A fourth aspect of the invention provides a fruit or vegetable picking system, comprising: a base; one or more robotic picking arms mounted on the base, the one or more picking arms each having an end-effector according to the first aspect or second aspect; a storage system mounted on the base, the storage system having a filling location configured to receive picked fruit or vegetables, wherein the one or more robotic picking arms are controllable to deliver picked fruit or vegetables to the one or more filling locations. An appropriate fruit or vegetable picking system is described in WO2020/201766.

In embodiments in which the end-effector comprises a local storage vessel, the one or more robotic picking arms are controllable to move the end-effector to the filling location and open the door of the local storage vessel to deliver picked objects from the collection volume to the filling location.

Any of the features described herein in relation to any embodiment or aspect of the invention may be applied to any aspect of the invention, either individually or in any combination. In particular, features of the first aspect may be applied to the second aspect, and features of the second aspect may be applied to the first aspect.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
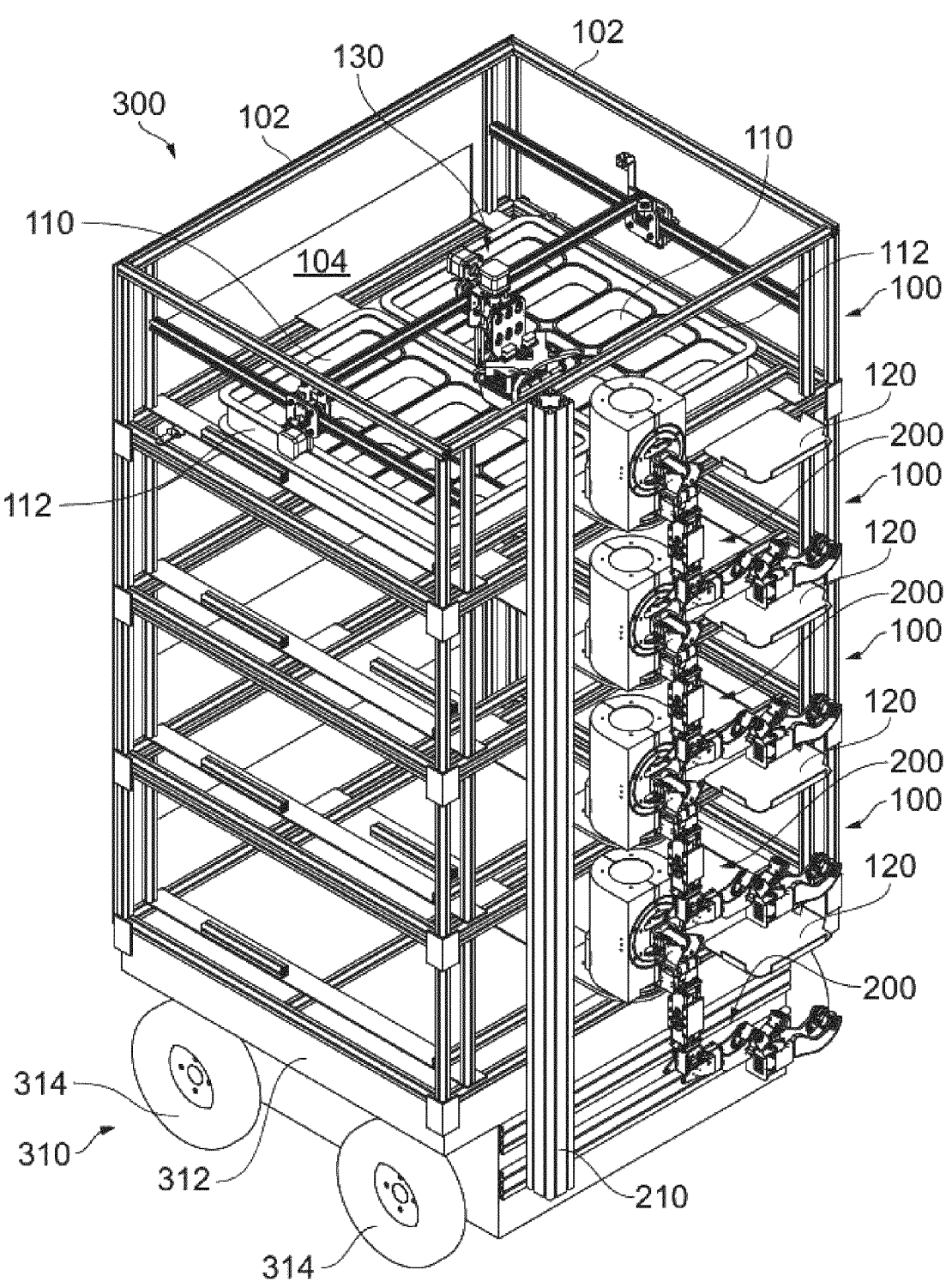
FIG. 1 is an isometric view of a fruit or vegetable picking system comprising robotic picking arms suitable for use with an end-effector according to the invention.
Figure 2:
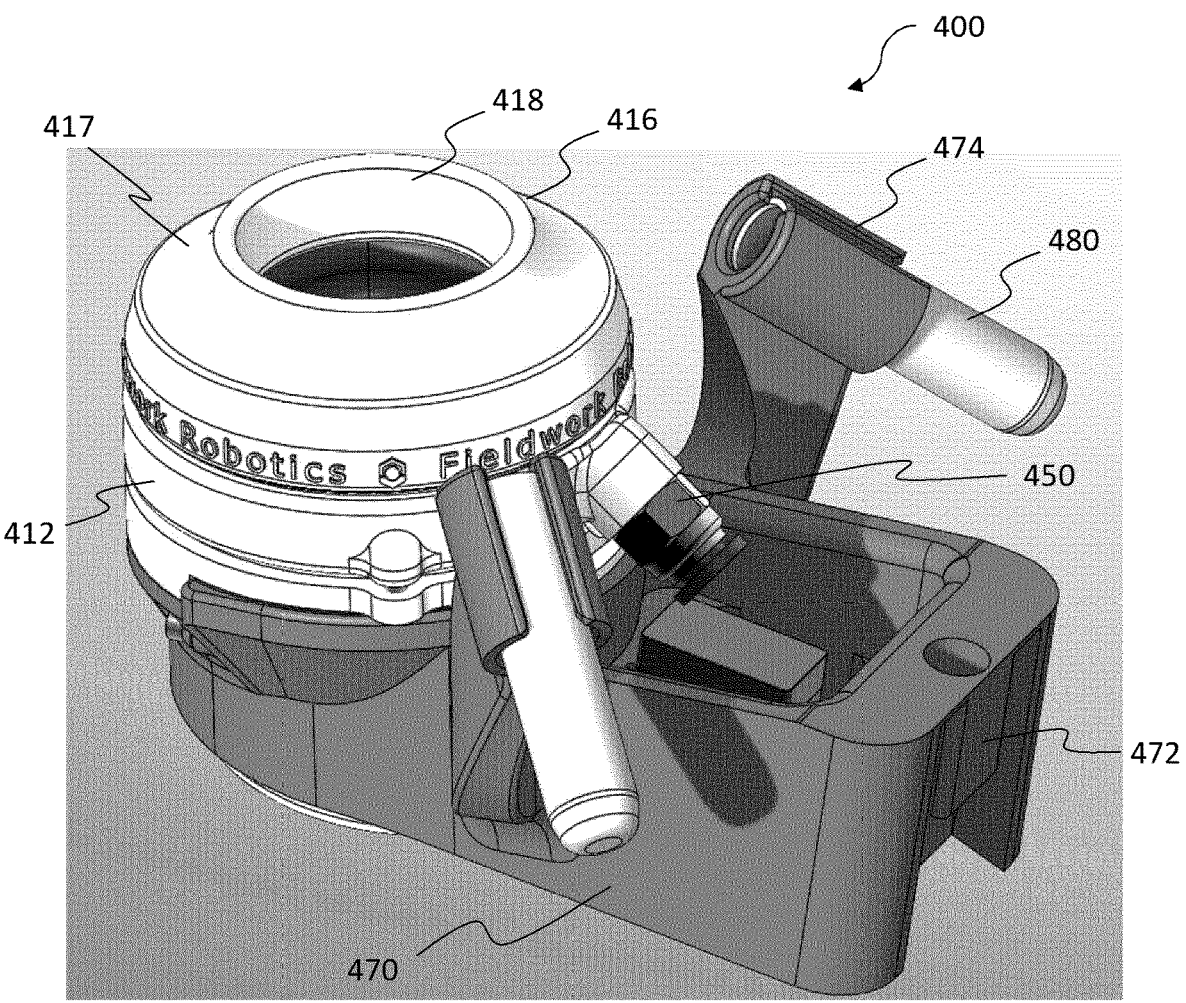
FIG. 2 is an isometric view of an end-effector according to an embodiment of the invention.
Figure 3:
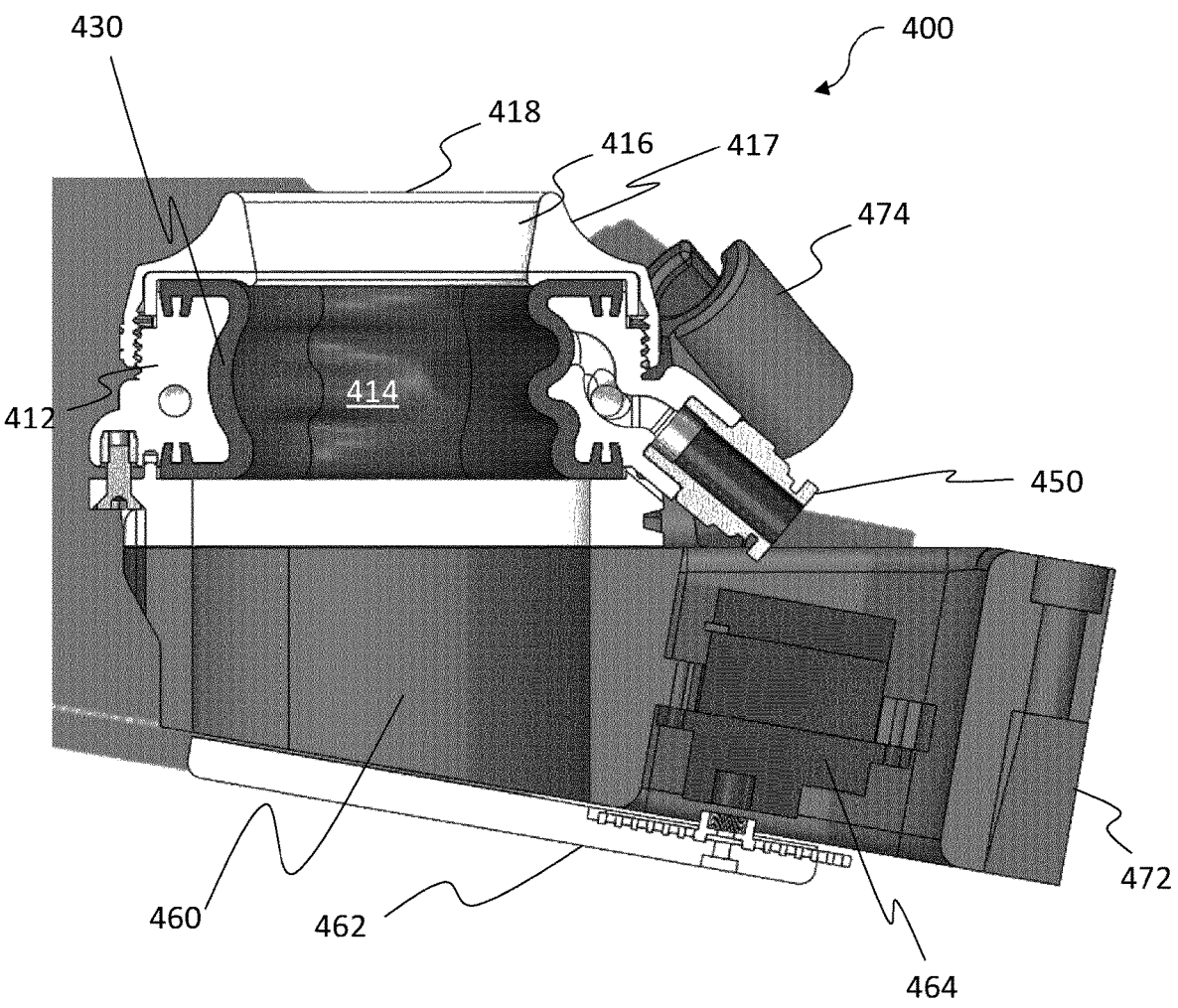
FIG. 3 is a cross-sectional view of the end-effector of FIG. 2.
Figure 4:
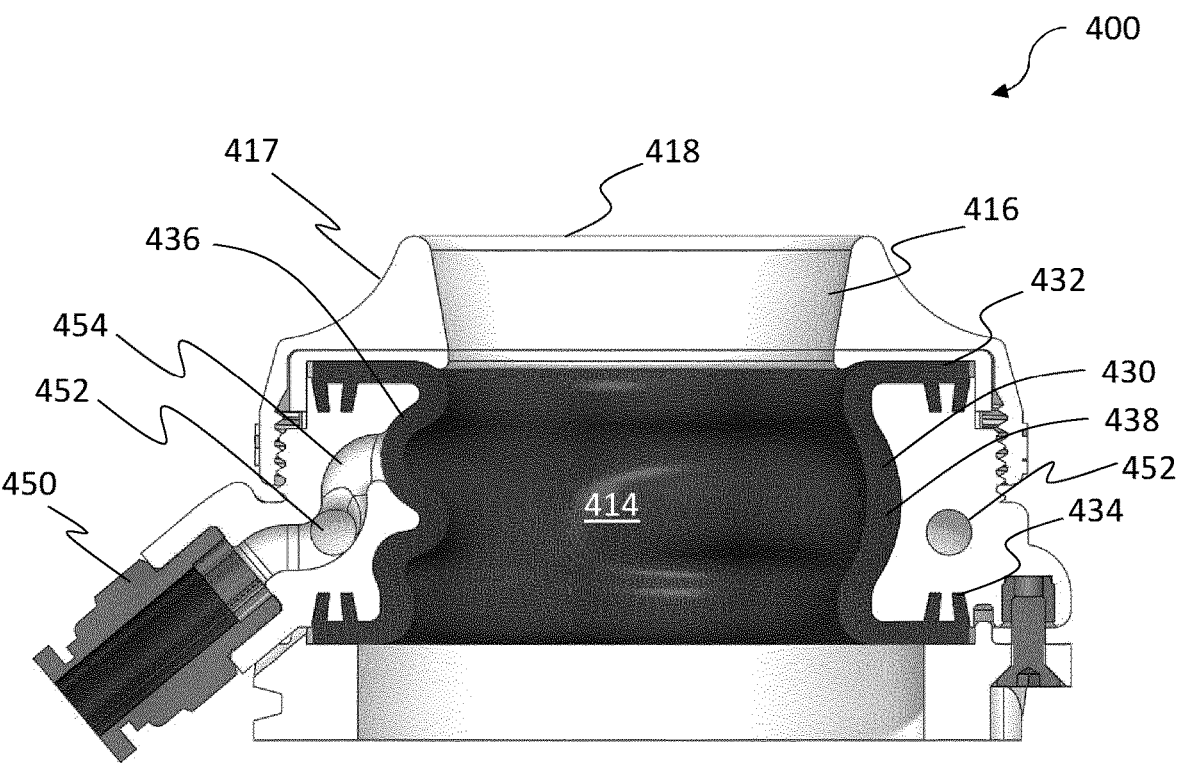
FIG. 4 is a cross-sectional view of various features of the end-effector of FIG. 2, including features of the housing and membrane.

The present invention provides an end-effector 400, 500 suitable for use in a fruit or vegetable picking/harvesting system 300 comprising one or more robotic picking arms 200 that each deliver picked fruit or vegetables to a respective storage system 100. A suitable fruit or vegetable picking/harvesting system 300 is disclosed in WO2020/201766.

The robotic picking arms 200 may comprise any suitable robotic arm suitable for use with an end-effector configured for fruit or vegetable picking, and so the features of robotic picking arms are not discussed below. An appropriate configuration for such a robotic picking arm 200 is disclosed in WO2019/053474.

The illustrated example picking system 300 comprises a movable base 310. In the illustrated embodiments the base 310 comprises a generally rectangular platform 312, or chassis, that is propellable by four wheels 314. In some embodiments the wheels 314 may be adapted to travel along rails or other tracks in a floor of a location in which the picking system 300 is operated.

A plurality (four in the illustrated embodiments) of storage systems 100 are stacked on top of one another on the base 310, and a robotic picking arm 200 is mounted in a fixed position relative to each storage system 100. The robotic picking arms 200 are each mounted at respective vertical positions along a generally vertical mounting column 210 fixed to the base 310. The vertical spacing between each picking arm 200 corresponds to a vertical height of each storage system 100.

Each storage system 100 has a superstructure 102 comprising a rigid framework or other rigid housing defining an interior volume within which picked fruit is stored in a plurality of (twenty in the illustrated embodiments) containers 110 (e.g. punnets). Each container 110 is positioned at a respective container location. The containers 110 and corresponding container locations are arranged in a generally horizontal array and are seated in one or more (two in the illustrated embodiments) trays 112 (also referred to as crates). The trays 112 can be removed via a tray opening 104 in a rear face of the storage system 100 when the containers 110 are full.

Each storage system 100 comprises a filling location 120 where picked fruit or vegetables are delivered by the respective robotic picking arm 200. In the arrangement illustrated in FIG. 1 the filling location 120 takes the form of a shelf on which a container 110 can be seated. In other embodiments the filling location 120 may comprise no shelf or corresponding structural features. The picking arms 200 are located adjacent the filling locations 120 to minimise the distance travelled by each picking end-effector 210 between picking of an item of fruit or vegetable and delivery of that item to the storage system 100.

End-effectors 400, 500 according to various embodiments of the invention are illustrated in FIGS. 2 to 12.

The embodiments illustrated in FIGS. 2 to 8 are described first.

The end-effector 400 comprises a housing 410 comprising a generally tube-like portion 412 defining an internal volume 414 within which a flexible membrane 430 is located. The membrane 430 has a generally ring-like shape, with an upper edge 432 and a lower edge 434 that are each sealed around their peripheries to provide a generally ring-shaped inflatable volume 440. The membrane is made of a silicone material, or other resilient, flexible material.

In general, the membrane is moved between uninflated and inflated configurations to control the size and shape of the inflatable volume 440 and the central aperture defined by the membrane, and thereby grip a targeted fruit or vegetable. In some embodiments the size and shape of the inflatable volume 440 is further controlled to pick a gripped fruit or vegetable. This will be described further below.

An air inlet/outlet port 450 is connectable to a compressed air pump 456 to deliver and remove compressed air to and from the inflatable volume 440. The air inlet/outlet port 450 is in fluid communication with the inflatable volume 440 via a generally ring-shaped conduit 452 within the tube-like portion 412 of the housing 410, which encircles the internal volume 414 and membrane 430. Three branch conduits 454 interconnect the ring-shaped conduit 452 with the inflatable volume 440. This arrangement ensures an even inflation of the membrane 430 around its circumference. In other embodiments, however, there may be only a single conduit in fluid communication with the inflatable volume 440, or alternatively two or more conduits.

The housing 410 further comprises a fruit receiving portion 416 extending across the upper face of the tube-like portion 412. The receiving portion 416 has an entry passageway 418 generally aligned with the tube-like portion 412 and internal volume 414. The entry passageway is generally frusto-conical in shape, such that it has a diameter that narrows towards the internal volume 414. This arrangement encourages funneling or centring of fruit to be picked towards the centre of the internal volume 416.

The receiving portion 416 also comprises a tapered outer surface 417 extending around the uppermost opening of the entry passageway 418. The receiving portion comprises a generally ring-shaped member defining the tapered outer surface 417 that is sloped such that its diameter, or width, increases with distance downwardly away from the uppermost opening. Thus, the tapered outer surface 417 has a generally conical shape, though it may have a curved profile as illustrated in the drawings. The shape of the tapered outer surface 417 of the receiving portion 416 serves to enable a single one of an item of fruit or vegetables to be isolated from a cluster of multiple fruit or vegetables by urging adjacent fruit or vegetables away from the entry passageway 418. For example, soft fruit such as e.g. raspberries or strawberries tend to grow in clusters, but it is necessary to pick each fruit individually; once a particular fruit has been targeted, the end-effector 400 is moved by the robotic picking arm 200 so that the targeted fruit enters the internal volume 414 via the entry passageway 418, and the conical shape of the tapered outer surface 417 tends to urge other fruits in the cluster away from the entry passageway 418.

Furthermore, the overall outer shape of the outer housing 410 as a whole may be tapered so that its diameter, or width, increases with axial distance from the uppermost opening of the entry passageway 418. Such an arrangement further improves the ability of the end-effector to successfully target a single fruit or vegetable from a cluster of fruit or vegetables. In particular, by tapering the outer shape of the outer housing 410 as a whole, it is possible to provide particularly steep taper angles.

In the illustrated examples the tube-like portion 412 and receiving portion 416 of the housing 410 are separable parts. The upper edge 432 of the membrane 430 is clamped between the tube-like portion 412 and receiving portion 416 to thereby provide the upper seal of the inflatable volume 440. In other embodiments the tube-like portion 412 and receiving portion 416 may be integral in one unitary part, and the seal may be achieved by alternate means as will be readily understood by the skilled person.

The housing 410 also comprises a local storage vessel 460 extending across the lower face of the tube-like portion 412, the local storage vessel 460 defining a collection volume that sits beneath the internal volume 414. The local storage vessel 460 comprises a cup-like member which is open to the internal volume 414 at its upper face. In this way, fruit or vegetables picked by the end-effector fall under gravity into the collection volume of the local storage vessel 460.

The base of the local storage vessel 460 comprises a door 462 that can be moved between open and closed configurations by an actuator 464. In the illustrated embodiment the actuator 464 acts to pivot the door between the open and closed configurations so that the door 462 slides progressively across the open base of the local storage vessel. However, the skilled person will understand that multiple alternative door mechanisms may be substituted. In the closed configuration the door 462 retains picked fruit or vegetables within the collection volume. Moving the door to the open configuration results in those picked items dropping under gravity to a collection receptacle beneath. This arrangement enables the end-effector to pick a number of fruit or vegetables in a particular area, before transporting those fruit or vegetables to a collection area such as filling location 120. This can significantly improve picking efficiency by reducing cycle times.

In the illustrated examples the tube-like portion 412 and local storage vessel 460 of the housing 410 are separable parts. The lower edge 434 of the membrane 430 is clamped between the tube-like portion 412 and local storage vessel 460 to thereby provide the lower seal of the inflatable volume 440. In other embodiments the tube-like portion 412 and local storage vessel 460 may be integral in one unitary part, and the seal may be achieved by alternate means as will be readily understood by the skilled person.

The housing 410 also includes a support structure 470 adapted to provide a rigid connection to a robotic picking arm 200 via an arm interface feature 472. The support structure 470 also includes a location for mounting the door actuator 464 and a pair of holders 474 for position sensors 480.

The position sensors 480 comprise two optical sensors which together provide stereo vision, enabling the location of the targeted fruit or vegetable to be determined in three dimensions. The position sensors 480 are used to provide feedback to the control system of the robotic picking arm 200 to ensure that the end-effector 400 is correctly located to ensure successful picking of a targeted fruit or vegetable. A suitable optical sensor is found in the NTC145 Autofocus Endoscope 0.57 inch (14.5 mm), produced by Teslong™. Key criteria for a suitable camera module, or sensor, includes short focal distance wide field-of-view, good colour accuracy, and exposure.

A pressure gauge 490 monitors air pressure within the inflatable volume 440. The monitored air pressure is used to determine when a targeted fruit or vegetable has been gripped, or picked, and to ensure that the fruit or vegetable is not damaged in the gripping and/or picking process. A microcontroller 492 receives air pressure data from the pressure gauge 490 and uses this data to control operation of the air pump 456 and associated solenoid valve 494, to thereby control the size and shape of the inflatable volume 440 and in turn the configuration of the membrane 430.

In preferred embodiments, the pump 456, solenoid valve 494 and microcontroller 492 are located at a base of the robotic picking arm 200 or on the superstructure 102 of the storage system 100. The pressure gauge 490 may also be located with these parts. A tube (not shown) delivers air from the pump 456 to the air inlet/outlet port 450. This arrangement minimises the mass of the end-effector 400 that must be moved by the robotic picking arm 200. In some embodiments a single pump 456 may supply multiple robotic picking arms 200.

The present invention encompasses a number of possible configurations and methods of operation of the membrane 430. In each of the embodiments the membrane 430 comprises a pliable sheet of a flexible material such as silicone.

Figure 5:
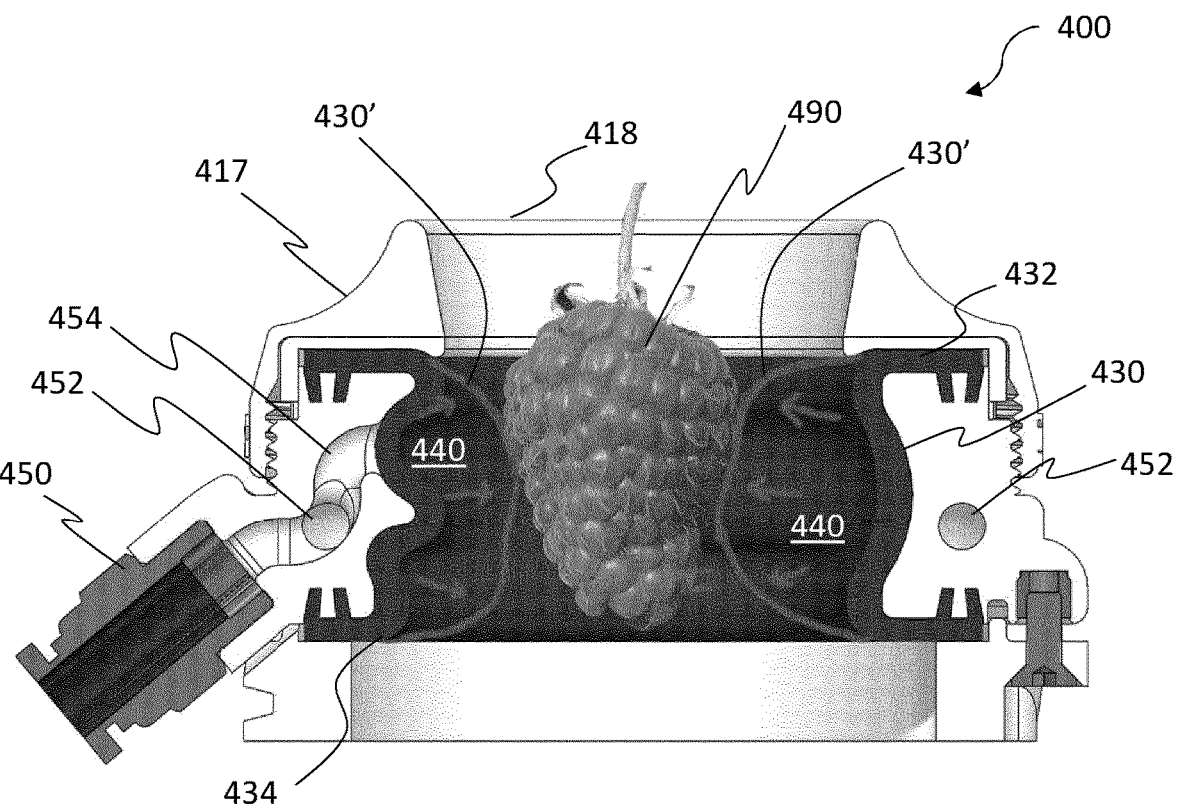
FIG. 5 is an illustration of various features of an end-effector according to a first embodiment of the invention, annotated to illustrate the movement of the membrane relative to a fruit to be picked.
Figures 6A, 6B:
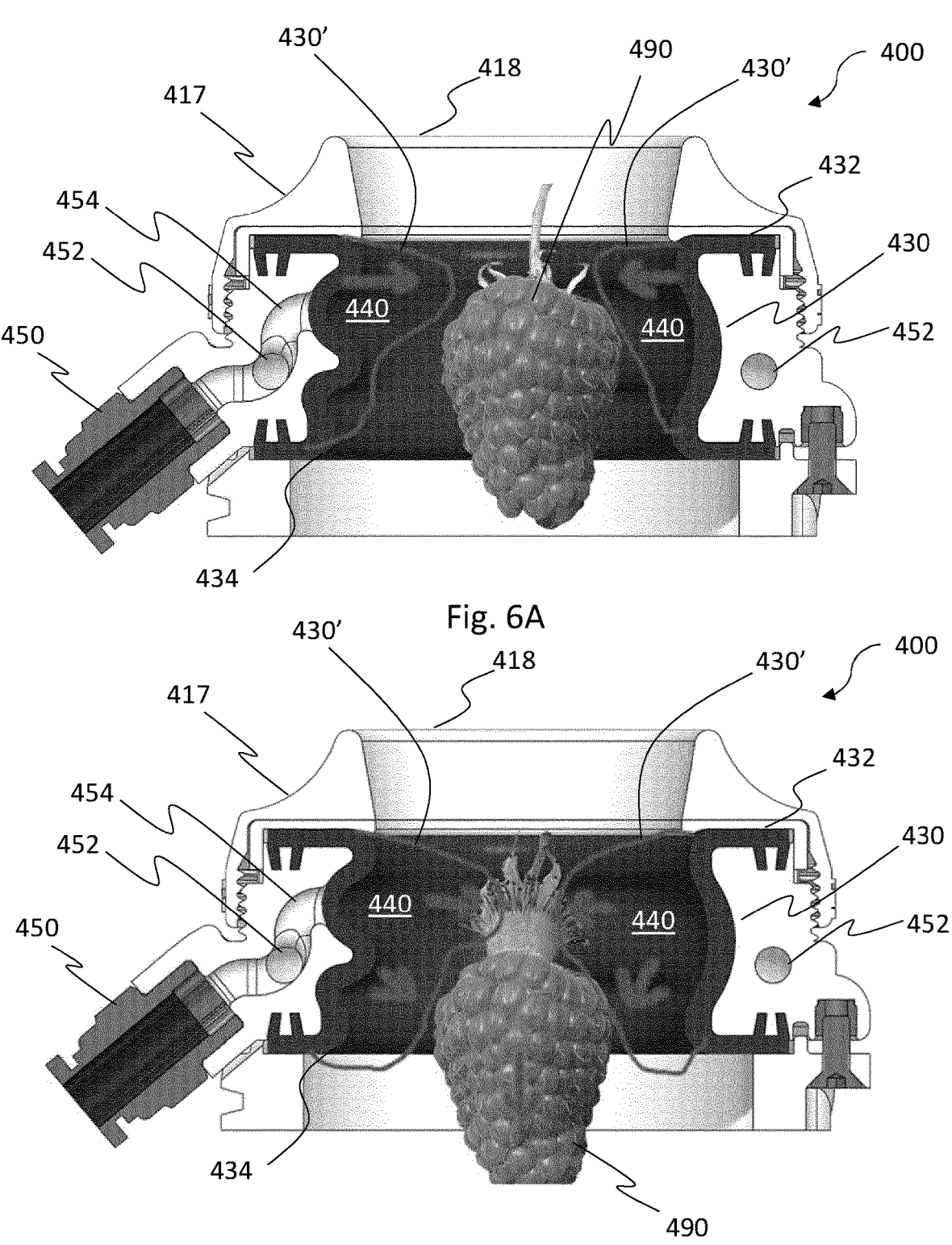
FIGS. 6A and 6B are illustrations of various features of an end-effector according to a second embodiment of the invention, annotated to illustrate the movement of the membrane relative to a fruit to be picked in a first phase (FIG. 6A) and a second phase (FIG. 6B)
Figure 7:
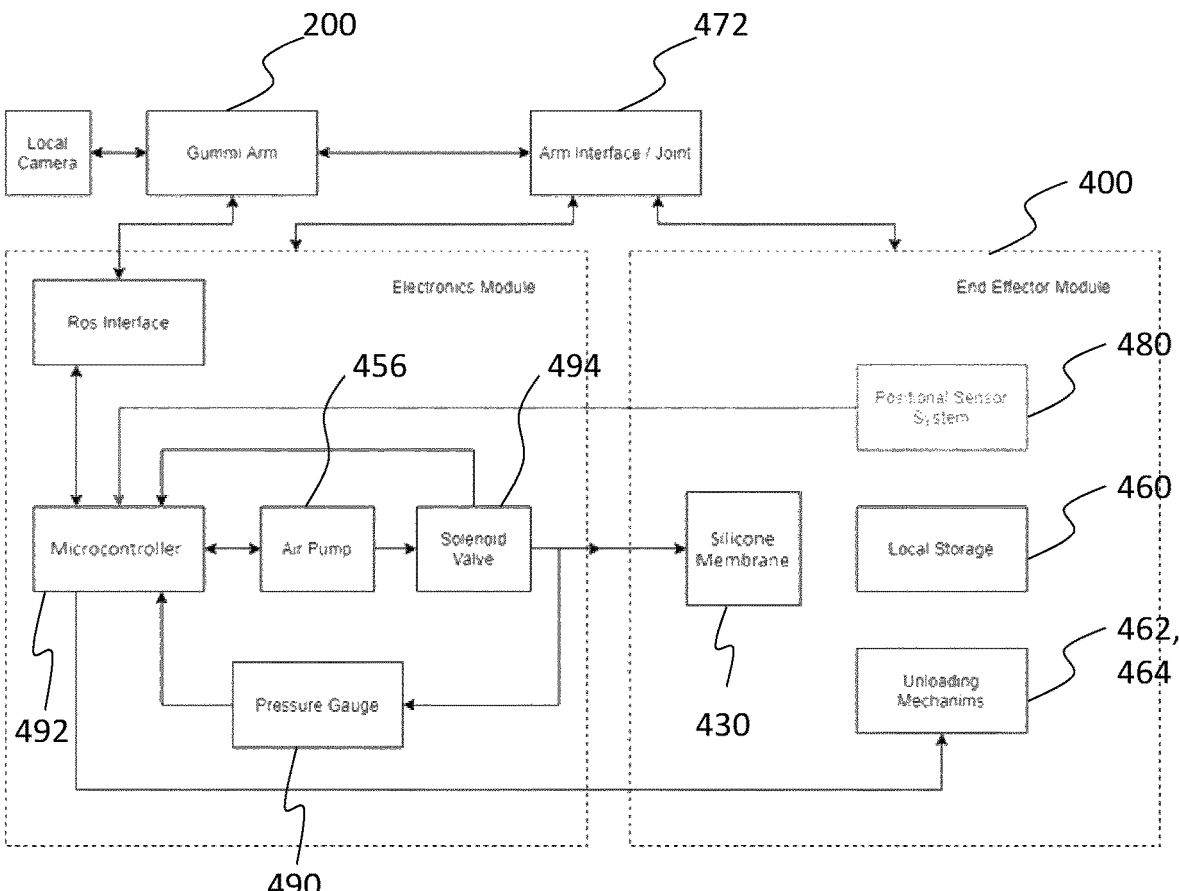
FIG. 7 is a schematic block diagram illustrating key features of an end-effector according to the invention in assembly with a robotic picking arm.

The figures illustrate membrane configurations in which the profile of the membrane 430 varies around its circumference and/or from top to bottom in the uninflated configuration, in order to control the shape of the membrane when it is inflated and the nature of its shape change during inflation. FIGS. 5, 6A and 6B show the membrane 430 in the uninflated configuration, and also include a line 430' to indicate the shape of the membrane in the respective inflated configuration.

In three first circumferential regions 436 of the outlets of the three branch conduits 454, the membrane has an undulating profile in the uninflated configuration such that the membrane bulges radially outwardly in an upper region adjacent each of the outlets of the branch conduits 454. In these first circumferential regions 436 the membrane 430 bulges radially inwardly in a middle region below the upper region, and bulges radially outwardly in a lower region below the upper region. In three second circumferential regions 438 located between respective first circumferential regions 436, the membrane 430 has a generally arcuate profile to form a gentle radially-outwardly protruding curved shape from top to bottom.

Figure 8:
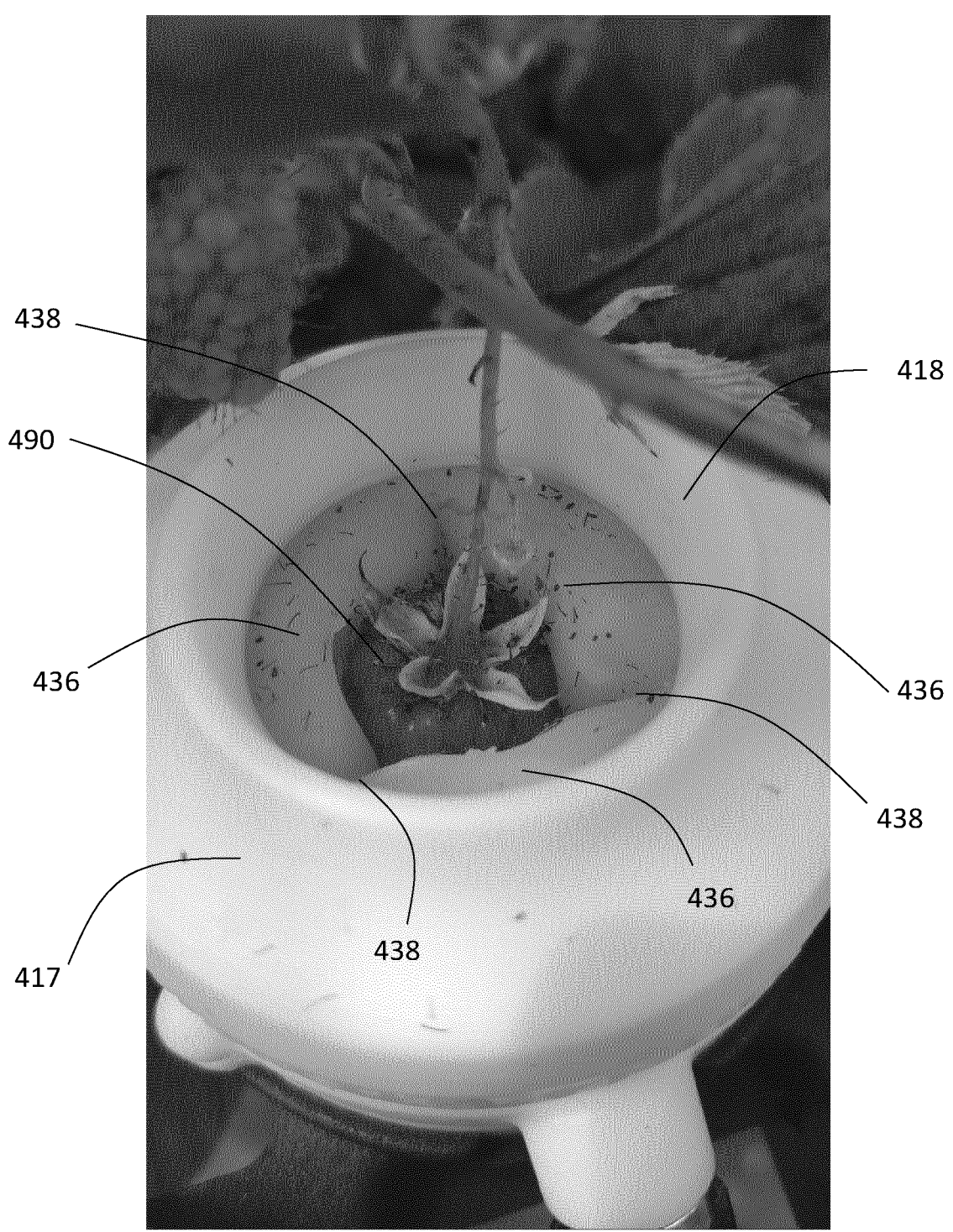
FIG. 8 is a photograph of an end-effector according to the invention in use.
Figure 9:
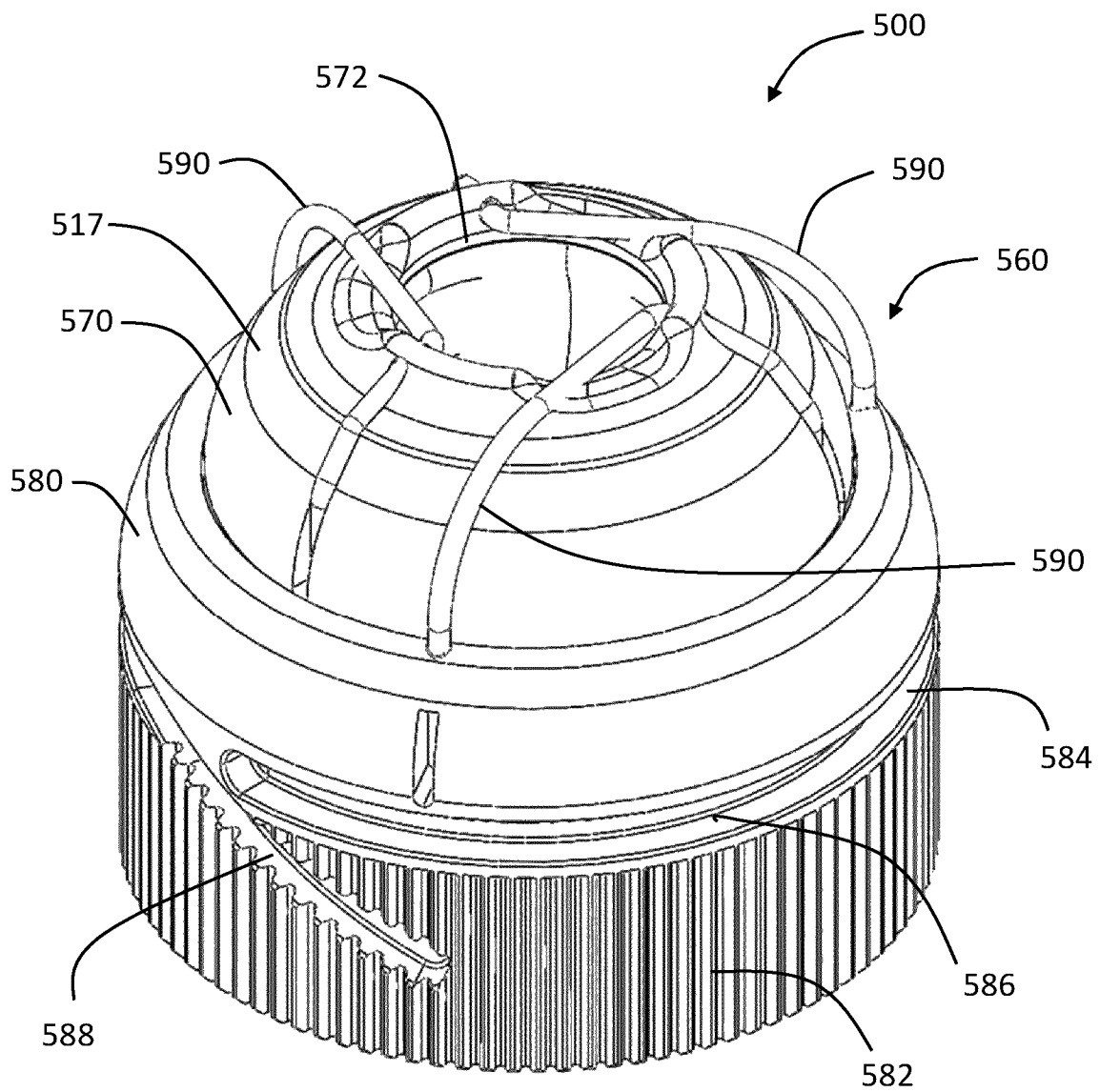
FIG. 9 is an isometric view of an end-effector according to an embodiment of the invention.
Figure 10:
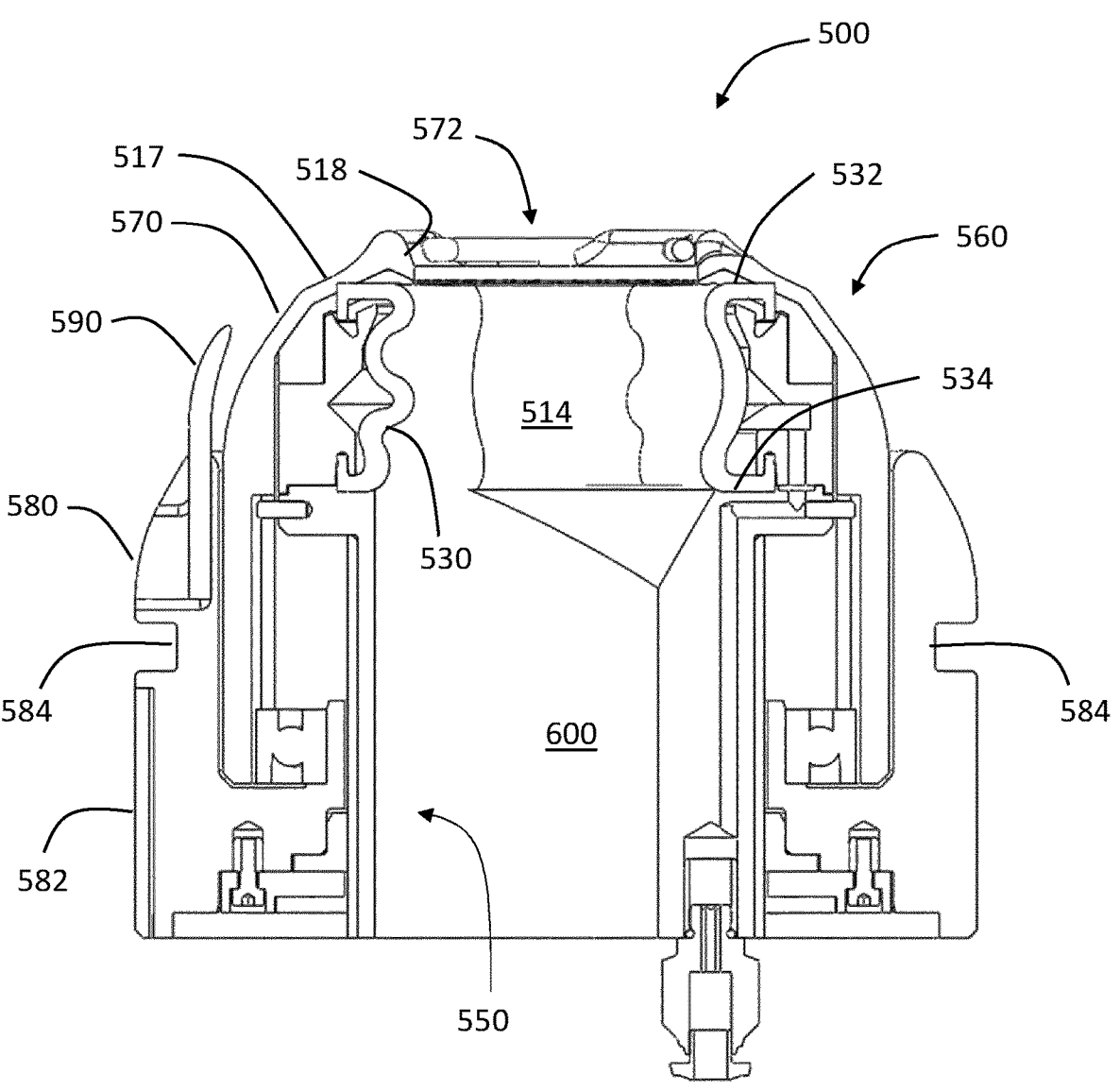
FIG. 10 is a cross-sectional view of the end-effector of FIG. 9.
Figure 11:
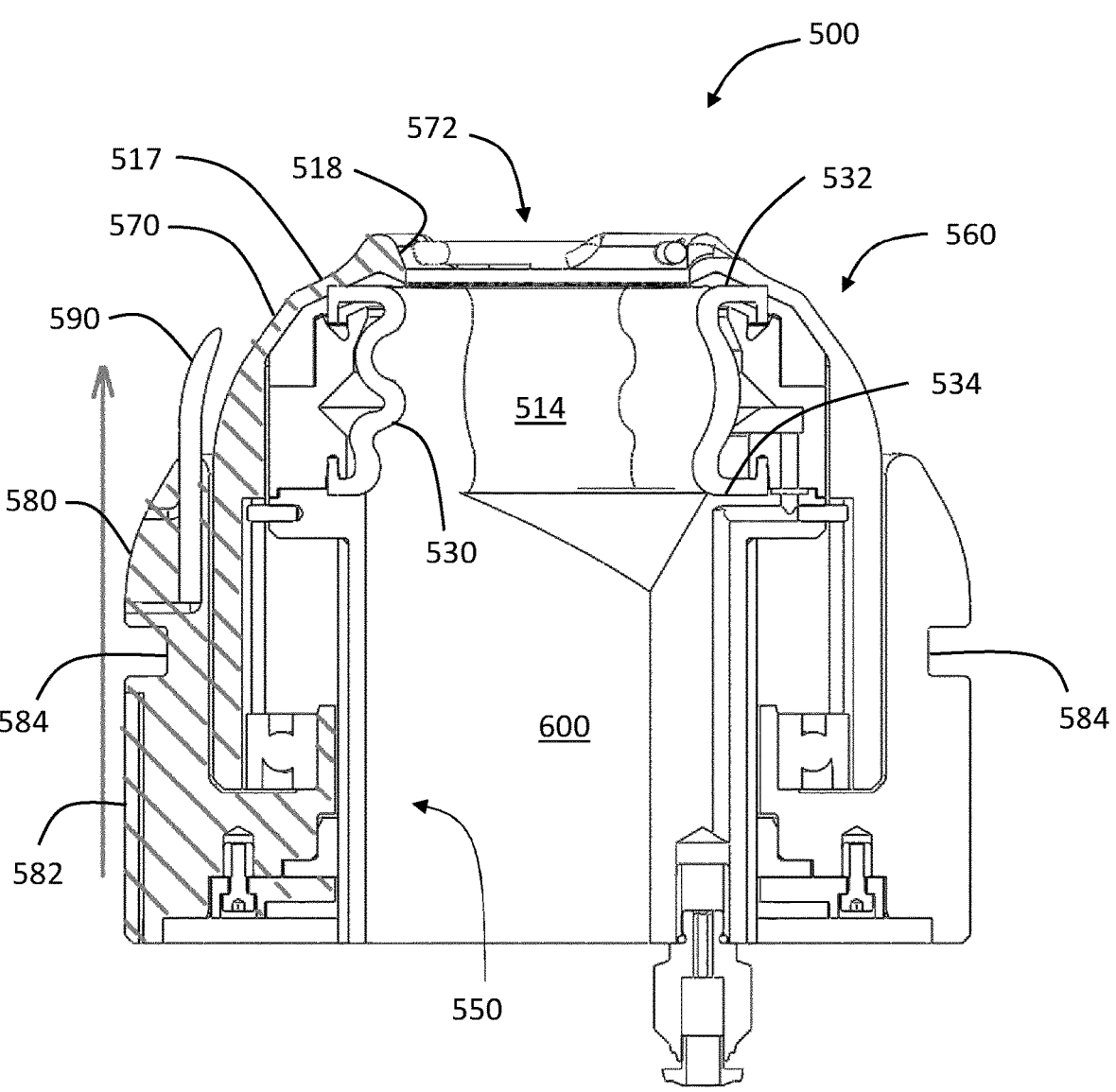
FIG. 11 is another cross-sectional view of the end-effector of FIG. 9, with additional annotations to identify the gripping member (by cross-hatching a left hand portion thereof) and illustrate its direction of movement.

This arrangement has two effects in particular. Firstly, the three first circumferential regions 436 tend to inflate to a greater degree than the second circumferential regions 438, such that the first circumferential regions 436 tend to form three tongues which extend radially inwardly towards one another during inflation of the membrane, while the second circumferential regions 438 tend to crease or fold to define edges of the tongues, as best seen in FIG. 8. This arrangement provides a particularly well-controlled inflation of the membrane 430 and secure gripping of the fruit or vegetable. In addition, this arrangement also serves to centre the fruit or vegetable within the internal volume, in a similar manner to a three-jaw chuck used to ensure central locating of a cutting tool on a lathe or drill. It is possible to form multiple tongues with a membrane that does not have circumferential regions with different profiles. However, providing the first and second circumferential regions ensures that the number, position and shape of those tongues are repeatable and predictable, and achieve a well-controlled inflation.

Secondly, as illustrated best in FIGS. 6A and 6B, the undulating profile of the first circumferential regions 436 of the membrane 430 causes the part of the inflatable volume 440 bounded by the upper regions to inflate first (a first phase of inflation to an inflated grasping configuration), to grasp a stem of the targeted fruit or vegetable 490, followed by inflation of the part of the inflatable volume 440 bounded by the lower regions (a second phase of inflation to an inflated picking configuration). The inwardly-bulging shape of the middle regions tends to cause the lower regions to be urged downwardly during this second phase of inflation, such that a fleshy portion of the fruit or vegetable 490 is urged downwardly away from the grasped stem. This arrangement enables the fruit or vegetable to be picked by detaching the desired fleshy portion from the stem without needing to move the robotic picking arm 200.

An alternative embodiment is illustrated in FIG. 5. In this embodiment a single inflation causes the part of the inflatable volume 440 bound by the first circumferential regions 436 to inflate (to an inflated grasping configuration) to grasp a fleshy portion of the targeted fruit or vegetable 490. The end-effector 400 is then moved downwardly along a picking trajectory by the robotic picking arm 200 to detach the fleshy portion from the stem. In this alternative embodiment the first circumferential regions 236 may have a different profile in the uninflated configuration to the illustrated undulating profile. For example, they may have a simple arcuate profile forming a radially-inwardly or radially-outwardly protruding curved shape.

Many further modifications are possible to the above embodiments. For example, the first circumferential regions 236 and/or the second circumferential regions 238 may have different profile shapes to those illustrated. Any profile shape sufficient to provide the desired shape of the membrane when it is inflated, and to control the nature of its shape change during inflation, may be applied.

In another example, the profile of the membrane 430 may not vary around its circumference in the uninflated configuration. Instead, the membrane 430 may have the profile shape of either the first circumferential regions 436 or the second circumferential regions 438 around its entire periphery. Alternatively, the membrane 430 may have a different profile shape around its entire periphery.

A particular alternative embodiment envisaged by the inventors is not illustrated herein, but is a modification of the illustrated embodiments that can be readily understood by description. In such an embodiment, a second membrane is positioned within the internal volume 414 beneath the membrane 430. In use, the membrane 430 is first inflated (to an inflated grasping configuration) to grasp the stem of a targeted fruit or vegetable. The second membrane is subsequently inflated (to an inflated picking configuration) to urge a fleshy portion of the fruit or vegetable downwardly away from the grasped stem. Like that of FIGS. 6A and 6B, this arrangement enables the fruit or vegetable to be picked by detaching the desired fleshy portion from the stem without needing to move the robotic picking arm 200.

A yet further alternative embodiment is illustrated in FIGS. 9 to 12. The end-effector 500 has many features in common with the end-effector 400 illustrated in FIGS. 2 to 8. In particular, the membrane 530 has corresponding structural features to the membrane 430 described above, and operates in the manner illustrated in FIG. 5.

The end-effector 500 comprises a membrane assembly 550 and a gripping assembly 560. In use, the membrane assembly 550 is affixed (directly or indirectly) to the robotic arm 220. The gripping assembly 560 grasps the stem (e.g. peduncle) of the fruit or vegetable to be picked, while membrane assembly 550 grasps the fleshy portion of the fruit or vegetable. Relative linear movement between the membrane assembly 550 and the gripping assembly 560 causes the fleshy portion to be detached from the stem, as described further below.

The membrane assembly 550 comprises a generally tube-like portion defining an internal volume 514, within which a flexible membrane 530 is located. The membrane 530 has a generally ring-like shape, with an upper edge 532 and a lower edge 534 that are each sealed around their peripheries to provide a generally ring-shaped inflatable volume (not illustrated). The membrane is made of a silicone material, or other resilient, flexible material.

In general, the membrane is moved between uninflated and inflated configurations to control the size and shape of the inflatable volume and the central aperture defined by the membrane, and thereby grip a targeted fruit or vegetable.

The membrane is inflated and deflated via a compressed air pump (not shown), which delivers and removes compressed air to and from the inflatable volume via a conduit and associated port (not shown).

Figure 12A:
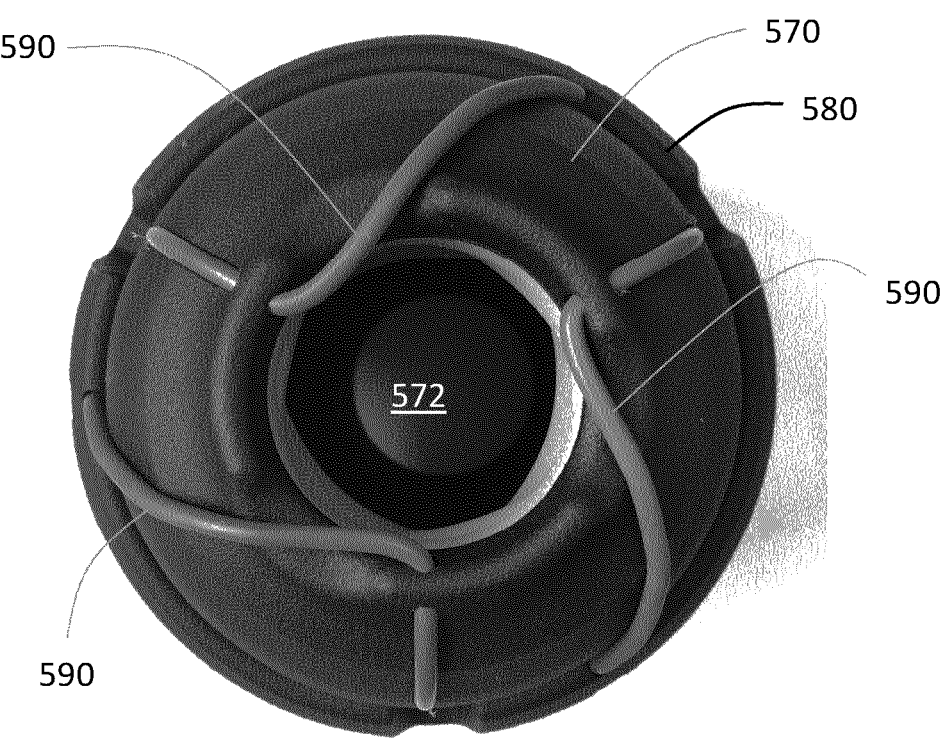
FIGS. 12A-D are top views illustrating four stages of operation of the end-effector of FIG. 9, from the initial configuration (FIG. 12A), to intermediate configuration (FIG. 12B), closed configuration (FIG. 12C), and finally to the gripping configuration (FIG. 12D).
Figure 12B:
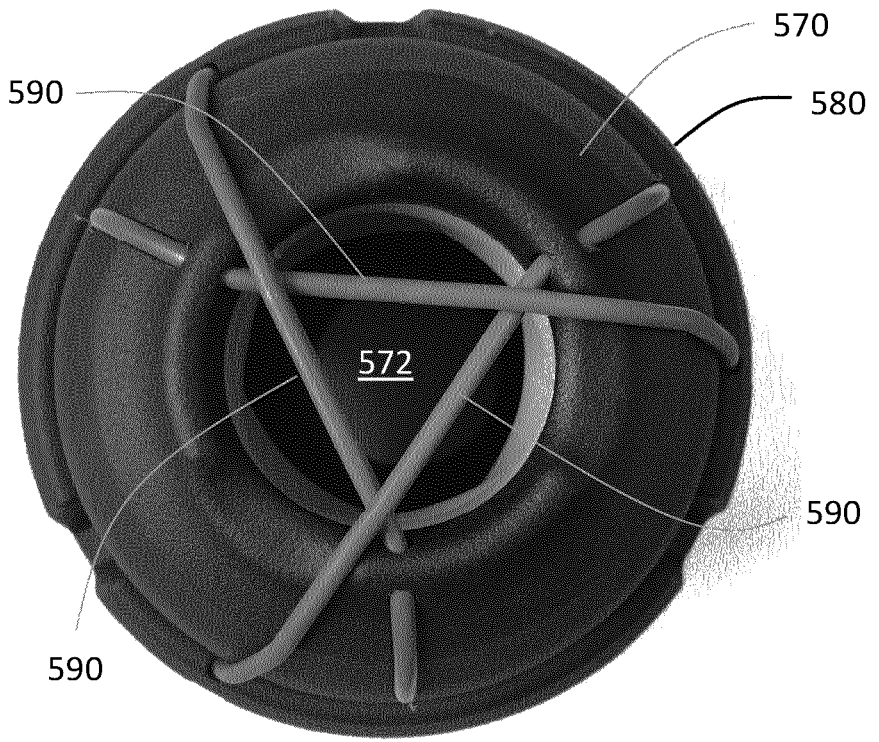
Figure 12C:
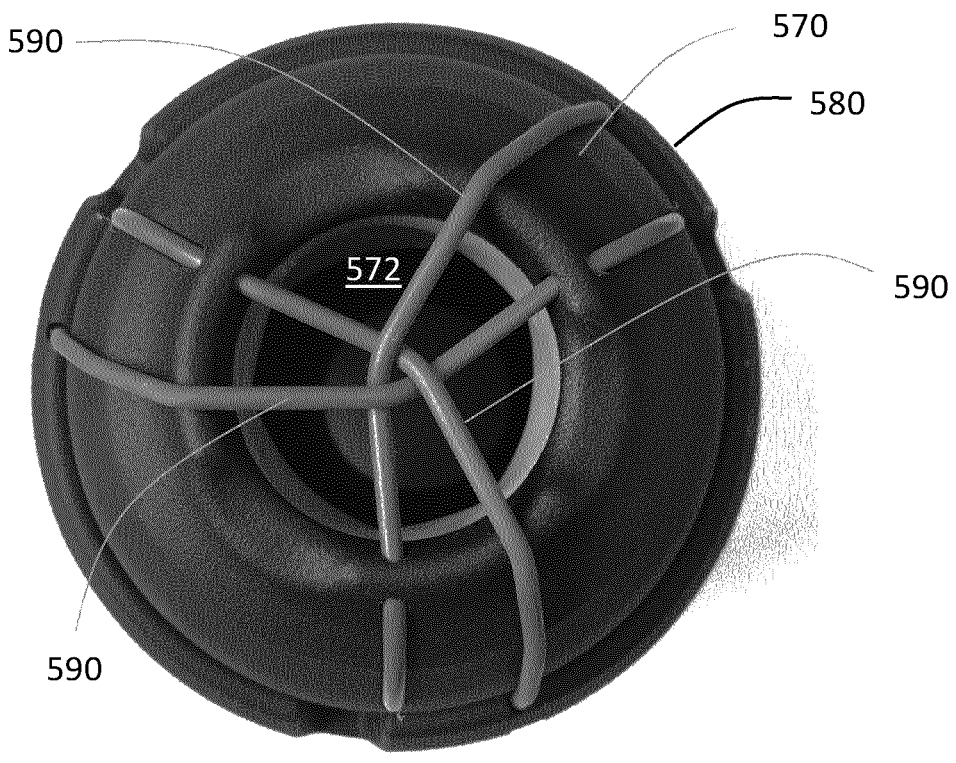

The gripping assembly 560 includes an upper member 570 and a lower member 580 able to rotate relative to the upper member 570 between an initial configuration (illustrated in FIGS. 9 and 12A) and a gripping configuration (illustrated in FIG. 12D), via an intermediate configuration (illustrated in FIG. 12B) and a closed configuration (illustrated in FIG. 12C). In some embodiments the closed configuration illustrated in FIG. 12C may provide sufficient clamping force to successfully grip a stem, and may therefore provide the gripping configuration of the invention.

The upper member 570 comprises a generally dome-shaped member with an entry aperture 572 at its upper face. The entry aperture 572 is sized to receive a single item of the targeted fruit to be picked. The entry aperture 572 leads to an entry passageway 518, which is generally aligned with the tube-like portion and internal volume 514. The entry passageway is generally frusto-conical in shape, such that it has a diameter that narrows towards the internal volume 514. This arrangement encourages funneling or centring of fruit to be picked towards the centre of the internal volume 514.

The upper member 570 also comprises a tapered outer surface 517 extending around the entry aperture 572. The tapered outer surface 517 is sloped such that its diameter, or width, increases with distance downwardly away from the entry aperture. Thus, the tapered outer surface 517 has a generally domed, or conical, shape. The shape of the tapered outer surface 517 serves to enable a single one of an item of fruit or vegetables to be isolated from a cluster of multiple fruit or vegetables by urging adjacent fruit or vegetables away from the entry aperture 572. For example, soft fruit such as e.g. raspberries or strawberries tend to grow in clusters, but it is necessary to pick each fruit individually;

once a particular fruit has been targeted, the end-effector 500 is moved by the robotic picking arm 200 so that the targeted fruit enters the internal volume 514 via the entry passageway 518, and the conical shape of the tapered outer surface 517 tends to urge other fruits in the cluster away from the entry passageway 518.

The lower member 580 comprises a generally ring-shaped member that encircles the upper member 570. An outer face of the lower member 580 carries a series of teeth 582 that extend in a ring around a periphery of the lower member 580. The series of teeth 582 form a driven gear when engaged by the teeth of a corresponding driving gear (not shown) driven by an actuator (not shown) in order to rotate the lower member 580 relative to the upper member 570. The skilled person will understand that there nature of the actuator is not critical, and that there are many possible appropriate actuator configurations. For example, the actuator may comprise an electric motor, such as a brushed DC motor, with hall effect sensor to detect end of travel, or alternatively a hydraulic or pneumatic actuator.

Figure 12D:
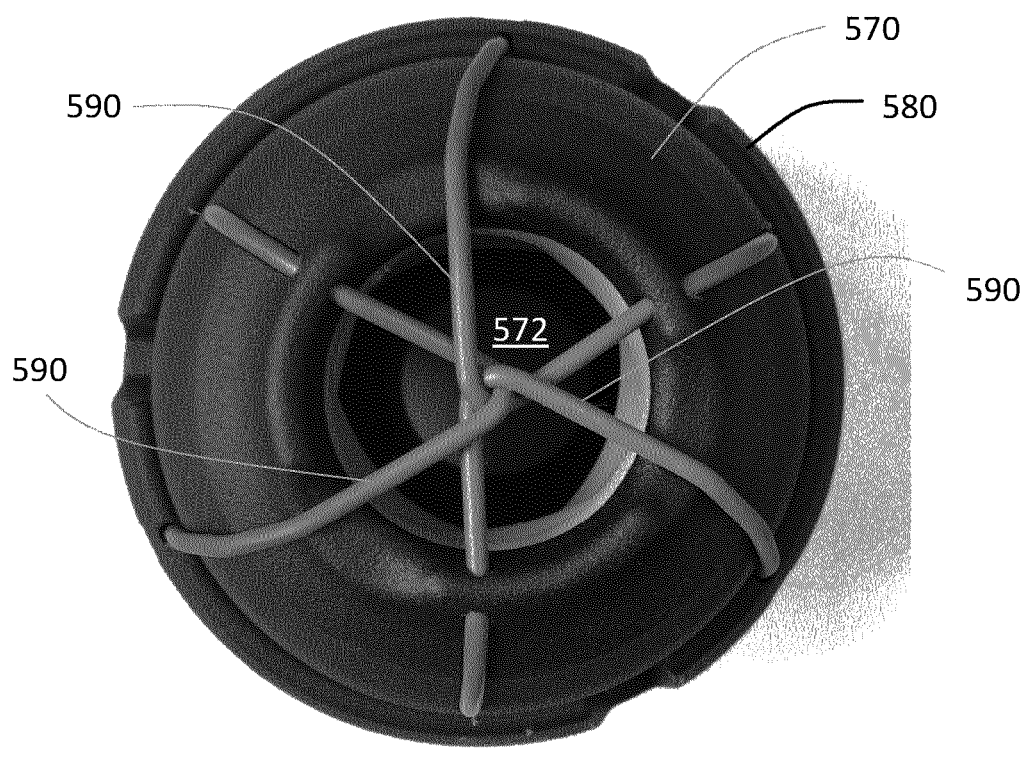

The gripping assembly 560 also includes three elastic cords 590, which move relative to one another as the gripping assembly 560 moves between the initial configuration (FIGS. 9 and 12A) and the gripping configuration (FIG. 12D). Each cord 590 is attached at one end to the upper member 570 and at its other end to the lower member 580. The attachment points are distributed equidistantly around the centreline of the end-effector 500 (i.e. around the entry aperture 572).

In the initial configuration (FIGS. 9 and 12A) the cords 590 do not obscure the entry aperture 572. In this position the cords 590 are retracted to their shortest length, and do not overlap or otherwise intersect one another. The lower member 580 is rotated clockwise (from the perspective of a top view) relative to the upper member 570 so that the cords 590 progressively overlap with one another and intersect to form a triangle-shaped opening 592 (FIG. 12B). Continued rotation of the lower member 580 to the gripping configuration (FIG. 12D), via the closed configuration (FIG. 12C), results in the opening 592 diminishing until the gripping force applied by the cords 590 to a stem is of an appropriate level.

Three cords 590 is considered optimum for the purposes of gripping the stem of a fruit or vegetable. However, in some embodiments a higher (or lower) number of cords may be utilised.

Cords 590 with elastic properties provide a particularly good grip on a stem in the gripping configuration, while minimising the risk of inadvertently cutting the stem. In particular, the elastic properties enable a degree of over-rotation of the lower member 580 to be provided (i.e. rotation beyond the closed configuration (FIG. 12C) to the gripping configuration (FIG. 12D), to provide a good grip. In addition, the elastic properties also ensure that the cords 590 are retracted in the initial configuration, so that they do not obscure the entry aperture 572. In some embodiments the cords 590 may comprise one or more non-stretchable portions and one or more elastic portions. In other embodiments the cords 590 may have no elastic properties at all, but may instead be slack in the initial configuration and taut in the gripping configuration.

In yet further embodiments the cords 590 may also, or alternatively, include a cutting portion configured to cut the stem of a fruit or vegetable in the gripping configuration.

A guide channel 584 also extends around the periphery of the lower member 580. The guide channel 584 includes a generally horizontal portion 586 and a sloped portion 588. A guide pin (not shown) mounted in a fixed position relative to the membrane assembly 550 is located within the guide channel 584. As the lower member 580 rotates, the guide pin slides within the guide channel 584, initially along the horizontal portion 586 and latterly along the sloped portion 588. As the guide pin enters the sloped portion 588 the gripping assembly 560 is urged linearly upwards, away from the membrane assembly 550.

The skilled person will understand that there are many other ways in which the desired rotational and/or linear movement of the gripping assembly 560 may be achieved. Similarly, they will understand that in some embodiments the membrane assembly 550 may instead be moved relative to the gripping assembly 560.

It is considered particularly advantageous to move the gripping assembly 560 upwardly away from the membrane assembly in order to achieve separation of the fleshy part of the fruit or vegetable from the stem. In particular, no movement of the robotic arm 200 is required, and therefore no complex control of the arm movement. In addition, the picking step is more consistent and controllable. There is also less disruption to the plant or tree from which the fruit or vegetable is being picked.

The end-effector 500 also comprises a local storage vessel 600 extending beneath, and rigidly affixed to, the membrane assembly 550. The local storage vessel 600 defines a collection volume that sits beneath the internal volume 514. The local storage vessel 600 comprises a cup-like member which is open to the internal volume 514 at its upper face. In this way, fruit or vegetables picked by the end-effector fall under gravity into the collection volume of the local storage vessel 600.

The base of the local storage vessel 600 may comprises a door (not shown) that can be moved between open and closed configurations by an actuator (not shown). In the closed configuration the door retains picked fruit or vegetables within the collection volume. Moving the door to the open configuration results in those picked items dropping under gravity to a collection receptacle beneath. This arrangement enables the end-effector 500 to pick a number of fruit or vegetables in a particular area, before transporting those fruit or vegetables to a collection area such as filling location 120. This can significantly improve picking efficiency by reducing cycle times.

Although not illustrated, the end-effector 500 may include position sensors such as the position sensors 480 described above with reference to FIGS. 2 to 8.

Similarly, the end-effector may include a pressure gauge that monitors air pressure within the inflatable volume. The monitored air pressure is used to determine when a targeted fruit or vegetable has been gripped, or picked, and to ensure that the fruit or vegetable is not damaged in the gripping and/or picking process. As described with respect to FIGS. 2 to 8, a microcontroller may receive air pressure data from the pressure gauge and use this data to control operation of the air pump, to thereby control the size and shape of the inflatable volume and in turn the configuration of the membrane 530.

As noted above, the membrane 530 of the end-effector 500 illustrated in FIGS. 9 to 12 has corresponding features to the membrane 430 described above in relation to FIGS. 2 to 8. In particular, the profile of the membrane 530 varies around its circumference in the uninflated configuration, in order to control the shape of the membrane when it is inflated and the nature of its shape change during inflation.

In three first circumferential regions the membrane 530 is relatively stiff, so that it is relatively resistant to deformation. This is achieved in this embodiment by its particular shape in the first circumferential regions: the membrane 530 has an undulating profile in the uninflated configuration such that the membrane bulges radially outwardly in an upper region, it bulges radially inwardly in a middle region below the upper region, and bulges radially outwardly in a lower region below the middle region. In three second circumferential regions located between respective first circumferential regions, the membrane 530 is relatively less stiff, so that it is less resistant to deformation. In the second circumferential regions the membrane 530 has a generally arcuate profile to form a gentle radially-outwardly protruding curved shape from top to bottom.

This arrangement has one particularly notable effect. The three first circumferential regions tend to inflate to a greater degree than the second circumferential regions, such that the first circumferential regions tend to form three tongues which extend radially inwardly towards one another during inflation of the membrane, while the second circumferential regions tend to crease or fold to define edges of the tongues (best seen in FIG. 8). This arrangement provides a particularly well-controlled inflation of the membrane 530 and secure gripping of the fruit or vegetable. In addition, this arrangement also serves to centre the fruit or vegetable within the internal volume, in a similar manner to a three-jaw chuck used to ensure central locating of a cutting tool on a lathe or drill. It is possible to form multiple tongues with a membrane that does not have circumferential regions with different profiles. However, providing the first and second circumferential regions ensures that the number, position and shape of those tongues are repeatable and predictable, and achieve a well-controlled inflation.

Many further modifications are possible to the above embodiments. For example, the first circumferential regions and/or the second circumferential regions may have different profile shapes to those illustrated. Any profile shape sufficient to provide the desired shape of the membrane when it is inflated, and to control the nature of its shape change during inflation, may be applied.

In another example, the profile of the membrane 530 may not vary around its circumference in the uninflated configuration. Instead, the membrane 530 may have the profile shape of either the first circumferential regions or the second circumferential regions around its entire periphery. Alternatively, the membrane 530 may have a different profile shape around its entire periphery.

The skilled person will recognise that many further modifications of the described embodiments are possible, without departing from the scope of the invention as defined in the appended claims.

The invention claimed is:

1. An end-effector for a robotic arm, the end-effector comprising:
an internal volume for receiving an object to be picked;
a flexible membrane within the internal volume, the membrane defining an entry aperture and an inflatable volume, and the membrane being configurable to increase the inflatable volume from an uninflated configuration to an inflated grasping configuration to thereby narrow the entry aperture and permit an object within the internal volume to be grasped; and
a tapered outer surface defining an uppermost opening of the end-effector, the uppermost opening permitting passage of an object to be picked into the internal volume via the entry aperture, wherein the outer surface is tapered so that its width increases with distance from the uppermost opening.

2. An end-effector according to claim 1, wherein the membrane includes a plurality of regions around its circumference, including one or more first regions that are less resistant to inflation than one or more second regions.

3. An end-effector according to claim 2, wherein the end-effector includes a plurality of conduits, each of the plurality of conduits being configured to permit air entry to and/or exit from a portion of the inflatable volume defined by a respective one of the one or more second regions.

4. An end-effector according to claim 1, wherein the membrane defines a cavity below the entry aperture, the cavity being wider than the entry aperture in the inflated grasping configuration, and the membrane is further inflatable from the inflated grasping configuration to an inflated picking configuration to thereby narrow the cavity.

5. An end-effector according to claim 1, including a local storage vessel beneath the internal volume, the local storage vessel defining a collection volume for collecting objects picked by the end-effector.

6. An end-effector according to claim 5, wherein the local storage vessel comprises a door at a lower face thereof, the door being openable from a closed configuration to an open configuration.

7. An end-effector according to claim 1, comprising an object entry passageway for guiding an object to be picked into the internal volume, the object entry passageway being positioned above the internal volume and having a width that narrows towards the internal volume.

8. A robotic picking arm comprising an end-effector according to claim 1, wherein the robotic picking arm is configured to move the end-effector through a picking movement trajectory when the membrane is in the inflated grasping configuration.

9. A fruit or vegetable picking system, comprising:
a base;
one or more robotic picking arms mounted on the base, the one or more picking arms each having an end-effector according to claim 1;
a storage system mounted on the base, the storage system having a filling location configured to receive picked fruit or vegetables,
wherein the one or more robotic picking arms are controllable to deliver picked fruit or vegetables to the one or more filling locations.

10. A picking system according to claim 9, wherein the end-effector comprises a local storage vessel beneath the internal volume, the local storage vessel defining a collection volume for collecting objects picked by the end-effector, and the one or more robotic picking arms are controllable to move the end-effector to the filling location and open the local storage vessel to deliver picked objects from the collection volume to the filling location.

11. A method of picking a fruit or vegetable using the end-effector according to claim 1, the method including the steps of:
moving the end-effector until a fruit or vegetable is located within the internal volume; and
inflating the inflatable volume to the inflated grasping configuration to thereby narrow the aperture and grasp the fruit or vegetable.

12. A method according to claim 11, including the subsequent step of:
moving the end-effector through a picking movement trajectory when the membrane is in the inflated grasping configuration.

13. An end-effector according to claim 1, wherein the entry aperture is sized to receive a single object to be picked.

14. An end-effector according to claim 13, wherein the uppermost opening has a static size.

15. An end-effector according to claim 13, wherein the tapered outer surface has a static taper angle.

16. An end-effector according to claim 1, wherein the uppermost opening has a static size.

17. An end-effector according to claim 16, wherein the tapered outer surface has a static taper angle.

18. An end-effector according to claim 1, wherein the tapered outer surface has a static taper angle.

* * * * *